United States Patent
Monden

(10) Patent No.: US 8,927,636 B2
(45) Date of Patent: Jan. 6, 2015

(54) POLYCARBONATE RESIN COMPOSITION AND MOLDED ARTICLE

(75) Inventor: Toshiki Monden, Kanagawa (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 313 days.

(21) Appl. No.: 13/120,383

(22) PCT Filed: Sep. 8, 2010

(86) PCT No.: PCT/JP2010/065371
§ 371 (c)(1),
(2), (4) Date: May 10, 2011

(87) PCT Pub. No.: WO2011/030772
PCT Pub. Date: Mar. 17, 2011

(65) Prior Publication Data
US 2011/0207846 A1    Aug. 25, 2011

(30) Foreign Application Priority Data

Sep. 14, 2009 (JP) ................. 2009-211362
Feb. 10, 2010 (JP) ................. 2010-027080
Apr. 15, 2010 (JP) ................. 2010-093620

(51) Int. Cl.
| | | |
|---|---|---|
| C08L 69/00 | (2006.01) | |
| C08K 5/42 | (2006.01) | |
| C08L 27/12 | (2006.01) | |
| C08L 51/06 | (2006.01) | |
| C08L 83/04 | (2006.01) | |
| H01M 2/02 | (2006.01) | |
| C08L 51/04 | (2006.01) | |

(52) U.S. Cl.
CPC . *C08L 69/00* (2013.01); *C08K 5/42* (2013.01); *C08L 27/12* (2013.01); *C08L 51/04* (2013.01); *C08L 83/04* (2013.01); *C08L 2205/03* (2013.01)
USPC ............................................. 524/395; 525/67

(58) Field of Classification Search
USPC ............................................. 525/67; 524/395
See application file for complete search history.

(56) References Cited

U.S. PATENT DOCUMENTS

| 6,838,502 B1 * | 1/2005 | Nodera et al. ................. 524/395 |
| 2005/0154103 A1 * | 7/2005 | Shibuya et al. ................. 524/284 |
| 2007/0135589 A1 | 6/2007 | DeRudder et al. |
| 2009/0326120 A1 * | 12/2009 | Kawagoshi et al. .......... 524/267 |

FOREIGN PATENT DOCUMENTS

| CN | 101336274 A | 12/2008 |
| EP | 1 201 715 A1 | 5/2002 |
| EP | 1 541 632 A1 | 6/2005 |
| JP | 54-32456 B2 | 10/1979 |
| JP | 1-217039 A | 8/1989 |
| JP | 5-125187 A | 5/1993 |
| JP | 6-263875 A | 9/1994 |
| JP | 8-176425 A | 7/1996 |
| JP | 2000-169696 A | 6/2000 |
| JP | 3263795 B2 | 3/2002 |
| JP | 2002-332401 A | 11/2002 |
| JP | 2004-510869 A | 4/2004 |
| JP | 2006-143949 A | 6/2006 |
| JP | 2006-206751 A | 8/2006 |
| JP | 2009-108281 A | 5/2009 |
| WO | WO 02/28970 A1 | 4/2002 |
| WO | WO 2008/114462 A1 | 9/2008 |

OTHER PUBLICATIONS

Search Report issued Sep. 12, 2011, in European Patent Application No. 10815367.7.
International Search Report PCT/JP2010/065371 dated Dec. 7, 2010.
Notification of First Office Action issued Mar. 12, 2012, in Chinese Patent Application No. 201080002722.0, with English translation.
Horbach et al., "Endgruppenbestimmungen an aromatischen Polycarbonaten", Die Makromolekulare Chemie, vol. 88, 1965, pp. 215-231.
English transiatlon of Interrnational Preliminary Report on Patentabiiity and Written Opinion issued Mar. 29, 2012. PCT International Application No, PCT/JP2010/065371.

* cited by examiner

*Primary Examiner* — Jeffrey Mullis
(74) *Attorney, Agent, or Firm* — Birch, Stewart, Kolasch & Birch, LLP

(57) ABSTRACT

To provide a polycarbonate resin composition excellent in flame resistance, impact resistance and external appearance and a molded article formed from the polycarbonate resin composition. The composition comprises 0.001 to 2 parts by mass of a metal organic sulfonate (B), 0.001 to 1 parts by mass of a fluoropolymer (C), 0.5 to 5 parts by mass of polyalkylsilsesquioxane particles having an average particle diameter of 0.6 to 5 μm (D), and 0.5 to 8 parts by mass of a graft copolymer (E) having a butadiene content ratio of 50% to 90%, relative to 100 parts by mass of a polycarbonate resin (A).

19 Claims, No Drawings

POLYCARBONATE RESIN COMPOSITION AND MOLDED ARTICLE

TECHNICAL FIELD

The present invention relates to a polycarbonate resin composition. More particularly, it relates to a polycarbonate resin composition that is excellent in a flame resistance, a impact resistance and a surface appearance, maintains a good impact resistance even in molding at a high temperature, shows a good impact resistance in sites having various corner R's and, moreover, is excellent even in a long period thermal deterioration-resistance, and to a molded article formed from the polycarbonate resin composition.

BACKGROUND ART

Polycarbonate resins are a resin excellent in a heat-resistance, a mechanical property and an electric characteristic, and is used generally, for example, for automobile materials, electric and electronic device materials, residential materials and materials for producing parts in other industrial fields, etc. In particular, a flame-retardant polycarbonate resin composition is favorably used as members of OA/information devices such as computers, notebooks, cellular phones, printers, and copying machines.

As a means for giving a flame resistance to a polycarbonate resin, conventionally, a halogen-based flame retardant or a phosphorous-based flame retardant has been blended to a polycarbonate resin. However, a polycarbonate resin composition blended with a halogen-based flame retardant containing chlorine or bromine occasionally causes the deterioration of thermal stability or the corrosion of a screw or a mold of a molding machine in molding. Moreover, a polycarbonate resin composition blended with a phosphorous-based flame retardant hinders it high transparency, which is a feature of polycarbonate resin, or deteriorates the impact resistance and the heat-resistance, to sometimes limit the application of the composition. In addition, since these halogen-based flame retardants and phosphorous-based flame retardants may bring about environmental pollution when the product is scrapped or recovered. Therefore, it is desired that a flame resistance is imparted without using these flame retardants.

Under such circumstances, in these years, metal organic sulfonate compounds represented by alkali metal organic sulfonate compounds and alkali earth metal organic sulfonate compounds (for example, see Patent Documents 1 to 2) are actively examined as a useful flame retardant.

However, the flame resistance achieved by blending a metal organic sulfonate alone into a polycarbonate resin is limited, and can not attain such high flame-resistant level as required in these years. For the metal organic sulfonate, the flame resistance to a polycarbonate resin is imparted through a catalytic function. When it is added in a large amount so as to obtain a high flame resistance, the flame resistance is not enhanced, but, inversely, is deteriorated.

On the other hand, the technique of blending a polyalkylsilsesquioxane particle to a polycarbonate resin is publicly known (see Patent Documents 3 to 4). In such a case, the purpose of blending the polyalkylsilsesquioxane particle is to give a diffusible property to the polycarbonate resin.

Moreover, a technique of blending the metal organic sulfonate and the silsesquioxane to a polycarbonate resin is proposed to improve the flame resistance (see Patent Documents 5 to 6).

It is described that, on this occasion, the use of a silsesquioxane having a particular functional group such as an epoxy group, a vinyl group or a phenyl group is necessary in order to improve the flame resistance.

However, in actual, it is difficult to obtain such a silsesquioxane industrially, and the level of the flame resistance is insufficient.

Furthermore, Patent Documents 7 to 8 describe a polycarbonate resin composition formed by blending a polyalkylsilsesquioxane, a metal organic sulfonate and a fluoropolymer to a polycarbonate resin. However, the level of a flame resistance is still insufficient, and, specifically, it can not attain a flame resistance of V-1 or higher according to the UL94 standard in a thickness of 0.8 mm or less.

Moreover, the composition is difficult to exert a impact resistance required for materials of a body of equipment etc., and there is such a problem that a impact resistance deteriorates significantly, in particular, when molding is carried out at a high temperature along with the size increase, or thickness reduction and size reduction of parts, when the product shape is made complex so as to have various corner R portions for enhancing the latitude of product design and attaining the size reduction, and when heat is applied for a long time.

BACKGROUND ART DOCUMENT

Patent Document

Patent Document 1: JP-B-54-32456
Patent Document 2: JP-A-2000-169696
Patent Document 3: Japanese Patent No. 3263795
Patent Document 4: JP-A-2006-206751
Patent Document 5: JP-A-8-176425
Patent Document 6: JP-T-2004-510869
Patent Document 7: JP-A-2006-143949
Patent Document 8: JP-A-2009-108281

DISCLOSURE OF THE INVENTION

Problems the Invention is to Solve

The present invention was created in view of the above-mentioned problems, and aims at providing a polycarbonate resin composition that has a extremely high flame resistance even when formed into a flakiness molded article, and, moreover, is also excellent in a flame resistance, a impact resistance and a surface appearance, maintains a good impact resistance in a molding even at a high temperature, represents a good impact resistance at portions having various corner R's, and, furthermore, is excellent in a long period thermal deterioration resistance, without using a halogen-based flame retardant or a phosphorous-based flame retardant that gives a high load to environments and human bodies, and providing a molded article thereof.

Means for Solving the Problems

The inventor of the present invention studied hard in order to solve the problems, and, as the result, found that it is possible to obtain a polycarbonate resin composition having an extremely high flame resistance and is also excellent in a impact resistance and an external appearance by incorporating a metal organic sulfonate, a fluoropolymer, specified silsesquioxane particles and a specified graft copolymer into a polycarbonate resin, thereby completing the invention. That is, the invention was attained according to a means below.

(1) A polycarbonate resin composition comprising 100 parts by mass of a polycarbonate resin (A), 0.001 to 2 parts by mass of a metal organic sulfonate (B), 0.001 to 1 parts by mass of a fluoropolymer (C), 0.5 to 5 parts by mass of polyalkylsilsesquioxane particles (D) having an average particle diameter of 0.6 to 5 and 0.5 to 8 parts by mass of a graft copolymer (E) having a butadiene content ratio of 50% to 90%.

(2) The polycarbonate resin composition according to (1), wherein the metal organic sulfonate (B) is an alkali metal salt of a fluorine-containing aliphatic sulfonic acid.

(3) The polycarbonate resin composition according to (1), wherein the metal organic sulfonate (B) is potassium perfluorobutane sulfonate.

(4) The polycarbonate resin composition according to any one of (1) to (3), wherein the polyalkylsilsesquioxane particle (D) is a polymethylsilsesquioxane particle.

(5) The polycarbonate resin composition according to any one of (1) to (4), wherein the graft copolymer (E) is a graft copolymer of a butadiene rubber and at least one selected from an aromatic vinyl compound, a vinyl cyanide compound and a (meth)acrylic acid ester.

(6) The polycarbonate resin composition according to any one of (1) to (4), wherein the graft copolymer (E) is a core/shell type graft copolymer comprising a core formed of a butadiene rubber and a shell formed from a (meth) acrylic acid ester compound.

(7) The polycarbonate resin composition according to any one of (1) to (6), wherein the content of the graft copolymer (E) is 0.5 to 4.5 parts by mass, relative to 100 parts by mass of the polycarbonate resin.

(8) The polycarbonate resin composition according to any one of (1) to (7), further comprising 0.0001 to 3 parts by mass of a carbon black (F), relative to 100 parts by mass of the polycarbonate resin.

(9) The polycarbonate resin composition according to (8), wherein the carbon black (F) is a black carbon master batch formed using a thermoplastic resin.

(10) The polycarbonate resin composition according to any one of (1) to (9), wherein the fluoropolymer (C) is a fluoroethylene resin capable of forming fibril.

(11) The polycarbonate resin composition according to any one of (1) to (10), wherein the content ratio (mass ratio) of the polyalkylsilsesquioxane particles (D) and the graft copolymer (E) is 1:0.5 to 1:6.

(12) The polycarbonate resin composition according to any one of (1) to (11), which has a flame resistance of V-1 or higher in accordance with the UL 94 test in a thickness of 0.8 mm.

(13) A polycarbonate resin molded article formed from the polycarbonate resin composition according to any one of (1) to (12).

(14) The polycarbonate resin molded article according to (13), which is used for a body of an electric/electronic device.

(15) The polycarbonate resin molded article according to (13), which is used for a body of a battery pack, a charger, or a power source adapter.

Advantage of the Invention

The polycarbonate resin composition and the molded article of the present invention can simultaneously enhance the flame resistance, the impact resistance and the external appearance. Furthermore, they can enhance even the impact resistance including a notch-depending property in a high temperature molding, and a long period thermal deterioration resistance.

MODE FOR CARRYING OUT THE INVENTION

Hereinafter, the present invention will be explained in detail while showing embodiments, exemplified matters, etc., but the invention is not limited to embodiments, exemplified matters, etc. shown below. It can be put into practice after arbitrary changes within a range that does not deviate from the gist of the invention.

1. Summary

The polycarbonate resin composition of the invention comprises at least a polycarbonate resin (A), a metal organic sulfonate (B), a fluoropolymer (C), a polyalkylsilsesquioxane particle having an average particle diameter of 0.6 to 5 μm (D), and a graft copolymer having a butadiene content of 50% or more (E). The polycarbonate resin composition of the invention may comprise other components, if necessary.

2. Polycarbonate Resin

No limitation is imposed on the kind of polycarbonate resin for use in the polycarbonate resin composition of the invention. The polycarbonate resin may be used in one kind, or in two or more kinds in an arbitrary combination and ratio.

Meanwhile, the polycarbonate resin in the invention is a polymer comprising a carbonate bond represented by the Formula (1) below as a base structure thereof.

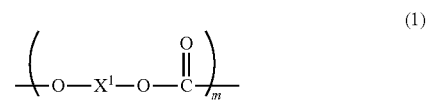

[Kagaku 1]

In Formula (1), $X^1$ is generally a hydrocarbon residue, which may have a hetero atom and/or a hetero bond introduced for providing various properties.

The polycarbonate resin can be classified into an aromatic polycarbonate resin and an aliphatic polycarbonate resin, in which a carbon directly bonded to the carbonate bond is an aromatic carbon and an aliphatic carbon, respectively, and either of these are usable. Of these, the aromatic polycarbonate resin is preferable from the viewpoints of a heat-resistance, a mechanical property, an electric characteristic, etc.

No limitation is imposed on specific kinds of the polycarbonate resin, and, for example, a carbonate polymer obtained by reacting a dihydroxy compound with a carbonate precursor may be exemplified. On this occasion, a polyhydroxy compound etc. may be reacted in addition to the dihydroxy compound and the carbonate precursor. Moreover, a method, in which carbon dioxide as a carbonate precursor is reacted with an cyclic ether, may be employed. The polycarbonate may have a linear chain shape, or a branched chain shape. The polycarbonate may be a homopolymer constituted of one kind of repeating unit, or a copolymer constituted of two or more kinds of repeating units. On this occasion, the copolymer may be selected from various copolymerization forms such as a random copolymer or a block copolymer. Meanwhile, such a carbonate polymer is generally a thermoplastic resin.

Of monomers to be the raw material of the aromatic polycarbonate resin, examples of the aromatic dihydroxy compounds include dihydroxybenzenes such as 1,2-dihydroxybenzene, 1,3-dihydroxybenzene (that is, resorcinol) and 1,4-dihydroxybenzene;

dihydroxybiphenyls such as 2,5-dihydroxybiphenyl, 2,2'-dihydroxybiphenyl and 4,4'-dihydroxybiphenyl;

dihydroxynaphthalenes such as 2,2'-dyhydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dyhydroxy-3,3'-dimethyldiphenyl ether, 1,4-bis(3-hydroxyphenoxy)benzene and 1,3-bis(4-hydroxyphenoxy)benzene;

bis(hydroxyaryl)alkanes such as 2,2-bis(4-hydroxyphenyl)propane (that is, bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(4-hydroxy-3,5-dimethylphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1-bis(4-hydroxyphenyl)ethane, 2-bis(4-hydroxyphenyl)ethane, 1,1-bis(4-hydroxyphenyl)-1-phenylethane, 1,1-bis(4-hydroxyphenyl)-1-naphthylethane, 1-bis(4-hydroxyphenyl)butane, 2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1-bis(4-hydroxyphenyl)octane, 2-bis(4-hydroxyphenyl)octane, 1-bis(4-hydroxyphenyl)hexane, 2-bis(4-hydroxyphenyl)hexane, 4,4-bis(4-hydroxyphenyl)heptane, 2,2-bis(4-hydroxyphenyl)nonane, 10-bis(4-hydroxyphenyl)decane, and 1-bis(4-hydroxyphenyl)dodecane;

bis(hydroxyaryl)cycloalkanes such as 1-bis(4-hydroxyphenyl)cyclopentane, 1-bis(4-hydroxyphenyl)cyclohexane, 4-bis(4-hydroxyphenyl)cyclohexane, 1,1-bis(4-hydroxyphenyl)-3,3-dimethylcyclohexane, 1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butyl-cyclohexane, 1,1-bis(4-hydroxyphenyl)-3-tert-butyl-cyclohexane, 1,1-bis(4-hydroxyphenyl)-3-phenylcyclohexane, and 1,1-bis(4-hydroxyphenyl)-4-phenylcyclohexane;

cardo structure-containing bisphenols such as 9,9-bis(4-hydroxyphenyl)fluorene, and 9,9-bis(4-hydroxy-3-methylphenyl)fluorene;

dihydroxydiaryl sulfides such as 4,4'-dihydroxydiphenyl sulfide, and 4,4'-dyhydroxy-3,3'-dimethyldiphenyl sulfide;

dihydroxydiaryl sulfoxides such as 4,4'-dihydroxydiphenyl sulfoxide, and 4,4'-dyhydroxy-3,3'-dimethyldiphenyl sulfoxide;

dihydroxydiaryl sulfones such as 4,4'-dihydroxydiphenyl sulfone, and 4,4'-dyhydroxy-3,3'-dimethyldiphenyl sulfone.

Of these, bis(hydroxyaryl)alkanes are preferable, bis(4-hydroxyphenyl)alkanes are more preferable, and 2,2-bis(4-hydroxyphenyl)propane (that is, bisphenol A) is particularly preferable from the viewpoint of a impact resistance and a heat-resistance.

Meanwhile, one kind of the aromatic dihydroxy compound may be used, or two or more kinds of the aromatic dihydroxy compound may be used in an arbitrary combination and ratio.

Examples of monomers to be the raw material of the aliphatic polycarbonate resins include alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol and decane-1,10-diol;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethyl-cyclobutane-1,3-diol;

glycols such as 2,2'-oxydiethanol (that is, ethylene glycol), diethylene glycol, triethylene glycol, propylene glycol, and spiro glycol;

aralkyldiols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl)ether, and bisphenol S bis(2-hydroxyethyl)ether;

cyclic ethers such as 1,2-epoxyethane (that is, ethylene oxide), 1,2-epoxypropane (that is, propylene oxide), 1,2-epoxycyclopentane, 1,2-epoxycyclohexane, 1,4-epoxycyclohexane, 1-methyl-1,2-epoxycyclohexane, 2,3-epoxynorbornane and 1,3-epoxypropane.

Of monomers to be the raw material of the aromatic polycarbonate resin, examples of the carbonate precursors include carbonyl halides, carbonate esters, etc. Meanwhile, the carbonate precursor may be used in one kind, or in two or more kinds in an arbitrary combination and ratio.

Specific examples of the carbonyl halides include phosgene; haloformates such as bischloroformate bodies of dihydroxy compounds and monochloroformate bodies of dihydroxy compounds.

Specific examples of the carbonate esters include diaryl carbonates such as diphenyl carbonate and ditolyl carbonate; dialkyl carbonates such as dimethyl carbonate and diethyl carbonate; and carbonate bodies of dihydroxy compounds such as biscarbonate bodies of dihydroxy compounds, monocarbonate bodies of dihydroxy compounds and cyclic carbonates.

Method for Producing a Polycarbonate Resin

No particular limitation is imposed on a method for producing a polycarbonate resin, and an arbitrary method may be employed. Examples thereof include an interfacial polymerization method, a melt transesterification method, a pyridine method, a ring-opening polymerization method of a cyclic carbonate compound, a solid phase transesterification method of a prepolymer, etc. In the invention, the interfacial polymerization method is preferable. Hereinafter, specific explanations will be given about particularly favorable methods therefrom.

Interfacial Polymerization Method

Firstly, a method of producing the polycarbonate resin by the interfacial polymerization method will be explained. In the interfacial polymerization method, a dihydroxy compound and a carbonate precursor (preferably, phosgene) is reacted in the presence of an organic solvent inactive for the reaction and an alkali aqueous solution while the pH is generally maintained to 9 or more, and then interfacial polymerization is performed in the presence of a polymerization catalyst, to thereby give a polycarbonate resin. Meanwhile, in the reaction system, a molecular weight adjusting agent (terminal blocking agent) may be present if necessary, and an antioxidant may be present in order to prevent the oxidation of the dihydroxy compound.

The dihydroxy compound and the carbonate precursor are those as described above. Meanwhile, of carbonate precursors, phosgene is preferably use, and the method using phosgene is, especially, referred to as the phosgene method.

Examples of the organic solvents inactive for the reaction include chlorinated hydrocarbons such as dichloromethane, 1,2-dichloroethane, chloroform, monochlorobenzene and dichlorobenzene; aromatic hydrocarbons such as benzene, toluene and xylene; etc. Meanwhile, the organic solvent may be used in one kind, or in two or more kinds in an arbitrary combination and ratio.

Examples of the alkali compounds contained in the alkali aqueous solution include alkali metal compounds such as sodium hydroxide, potassium hydroxide, lithium hydroxide and sodium hydrogen carbonate and alkali earth metal compounds, and, of those, sodium hydroxide and potassium hydroxide are preferable. Meanwhile, the alkali compound may be used in one kind, or in two or more kinds in an arbitrary combination and ratio.

No limitation is imposed on the concentration of the alkali compound in the alkali aqueous solution, and the compound is generally used in the range of 5 to 10% by mass in order to adjust the pH to 10 to 12 in the alkali aqueous solution for the reaction. Moreover, for example, when phosgene is injected, the molar ratio of the bisphenol compound and the alkali compound is preferably set to be generally 1:1.9 or more, preferably 1:2.0 or more, and generally 1:3.2 or less, preferably 1:2.5 or less, in order to control so that pH of the water phase falls in 10 to 12, preferably 10 to 11.

Examples of the polymerization catalysts include aliphatic tertiary amines such as trimethylamine, triethylamine, tributylamine, tripropylamine and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride and triethylbenzylammonium chloride; pyridine; guanine; salts of guanidine; etc. Meanwhile, the polymerization catalyst may be used in one kind, or in two or more kinds in an arbitrary combination and ratio.

Examples of the molecular weight-adjusting agents include aromatic phenols having a monovalent phenolic hydroxyl group; aliphatic alcohols such as methanol and butanol; mercaptan; phthalimide; etc., and, of those, aromatic phenols are preferable. Specific examples of the aromatic phenols include alkyl group-substituted phenols such as m-methyl phenol, p-methyl phenol, m-propyl phenol, p-propyl phenol, p-tert-butyl phenol and p-long chain alkyl-substituted phenol; vinyl group-containing phenols such as isopropanil phenol; epoxy group-containing phenols; carboxyl group-containing phenols such as o-oxine benzoic acid and 2-methyl-6-hydroxyphenyl acetic acid; etc. Meanwhile, the molecular weight adjusting agent may be used in one kind, or in two or more kinds in an arbitrary combination and ratio.

The molecular weight-adjusting agent is used in an amount of, relative to 100 mol of the dihydroxy compound, generally 0.5 mol or more, preferably 1 mol or more, and generally 50 mol or less, preferably 30 mol or less. By setting the amount to be used of the molecular weight adjusting agent in the range, the thermal stability and the hydrolysis resistant property of the polycarbonate resin composition are enhanced.

In the reaction, the order of mixing a reaction substrate, a reaction medium, a catalyst, an additive etc. is arbitrary, as long as the intended polycarbonate resin can be obtained, and an appropriate order may be set arbitrarily. For example, when phosgene is used as the carbonate precursor, the molecular weight-adjusting agent may be mixed at an arbitrary time from the reaction of the dihydroxy compound with the phosgene (phosgenization) to the initiation of the polymerization reaction.

Meanwhile, the reaction temperature is generally 0 to 40° C., and the reaction time is generally from several minutes (for example, 10 min) to several hours (for example, 6 hr).

Melt Transesterification Method

Next, a case of producing the polycarbonate resin by the melt transesterification method will be described. In the melt transesterification method, a transesterification reaction is performed, for example, between a carbonic acid diester and a dihydroxy compound.

The dihydroxy compound is as described above.

On the other hand, examples of the carbonic acid diesters include dialkyl carbonate compounds such as dimethyl carbonate, diethyl carbonate and di-tert-butyl carbonate; diphenyl carbonate; substituted diphenyl carbonates such as ditolyl carbonate; etc. Of these, diphenyl carbonate and substituted diphenyl carbonate are preferable, and, in particular, diphenyl carbonate is more preferable. Meanwhile, the carbonic acid diester may be used in one kind, or in two or more kinds in an arbitrary combination and ratio.

The ratio between the dihydroxy compound and the carbonic acid diester is arbitrary, only if the intended polycarbonate resin can be obtained, but, relative to 1 mol of the dihydroxy compound, the carbonic acid diester is used preferably in the equivalent molar amount or more, and, of those, is used more preferably in 1.01 mol or more. Meanwhile, the upper limit value is generally 1.30 mol or less. By setting the amount to the range, the amount of the terminal hydroxyl groups can be adjusted in the preferable range.

In the polycarbonate resin, the amount of the terminal hydroxyl groups thereof tends to give a large effect on thermal stability, hydrolysis stability, hue, etc. Accordingly, the amount of terminal hydroxyl groups may be adjusted by an arbitrary publicly known method, if necessary. In the transesterification reaction, generally, a polycarbonate resin, in which the amount of the terminal hydroxyl groups is adjusted, can be obtained by adjusting the mixing ratio of the carbonic acid diester and the aromatic dihydroxy compound, the degree of reduced pressure in the transesterification reaction, etc. Meanwhile, generally, the operation can also adjust the molecular weight of the polycarbonate resin to be obtained.

When the mixing ratio of the carbonic acid diester and the dihydroxy compound is adjusted in order to adjust the amount of the terminal hydroxyl groups, the mixing ratio is that as described above.

Moreover, as a more positive adjustment method, a method, in which a terminal blocking agent is separately blended in the reaction, is exemplified. Examples of the terminal blocking agents on this occasion include monovalent phenols, monovalent carboxylic acids, carbonic acid diesters, etc. Meanwhile, the terminal blocking agent may be used in one kind, or in two or more kinds in an arbitrary combination and ratio.

When the polycarbonate resin is produced by the melt transesterification method, a transesterification catalyst is generally used. Any arbitrary transesterification catalysts may be used. Of those, for example, the use of an alkali metal compound and/or an alkali earth metal compound is preferable. A basic compound, such as a basic boron compound, a basic phosphorous compound, a basic ammonium compound or an amine-based compound, may be supplementarily used in combination. Meanwhile, the transesterification catalyst may be used in one kind, or in two or more kinds in an arbitrary combination and ratio.

In the melt transesterification method, the reaction temperature is generally 100 to 320° C. The pressure condition in the reaction is generally a reduced pressure of 2 mmHg or less. As a specific operation, a melt polycondensation reaction may be performed under the above-mentioned condition, while by-products such as aromatic hydroxy compounds are removed.

The melt polycondensation reaction can be performed by either method of batch and continuous systems. When it is performed by the batch system, the reaction substrate, reaction medium, catalyst, additive etc. may be mixed in an arbitrary order as long as the intended aromatic polycarbonate resin can be obtained, and an appropriate order may arbitrarily be set. But, when the stability etc. of the polycarbonate resin and the polycarbonate resin composition are taken into consideration, the melt polycondensation reaction is preferably performed by a continuous system.

In the melt transesterification method, a catalyst-deactivating agent may be used, if necessary. As the catalyst-deactivating agent, any compounds that neutralize the transesterification catalyst may be used. Examples thereof include sulfur-containing acidic compounds, derivatives thereof, etc. Meanwhile, the catalyst-deactivating agent may be used in one kind, or in two or more kinds in an arbitrary combination and ratio.

The amount of the catalyst-deactivating agent to be used is, relative to the alkali metal or alkali earth metal contained in the transesterification catalyst, generally 0.5 equivalents or more, preferably 1 equivalent and more, and generally 10 equivalents or less, preferably 5 equivalents or less. Moreover, relative to the aromatic polycarbonate resin, it is generally 1 ppm or more, and generally 100 ppm or less, preferably 20 ppm or less.

Other Matters about the Polycarbonate Resin

The molecular weight of the polycarbonate resin is arbitrary and may be appropriately selected and determined, and the viscosity-average molecular weight [Mv] converted from a solution viscosity is generally 10000 or more, preferably 16000 or more, more preferably 17000 or more, and generally 40000 or less, preferably 30000 or less, more preferably 24000 or less. By setting the viscosity-average molecular weight to be the lower limit value or more of the range, it is possible to more enhance the mechanical strength of the polycarbonate resin composition of the invention, to thereby make the composition more preferable when it is used for applications requiring a high mechanical strength. On the other hand, by setting the viscosity-average molecular weight to be the upper limit value or less of the range, the deterioration of the flowability of the polycarbonate resin composition of the invention is suppressed and made better, to enable the moldability to be enhanced and the molding to be performed easily. Meanwhile, two or more polycarbonate resins having different viscosity-average molecular weights may be used in a mixture, and, in this case, a polycarbonate resin having a viscosity-average molecular weight outside the above-mentioned preferable range may be mixed.

Meanwhile, the viscosity-average molecular weight [Mv] means a value obtained by determining an intrinsic viscosity [η] (unit: dl/g) at 20° C. with a Uberode viscometer using methylene chloride as a solvent, and calculating from the Schnell's viscosity formula, that is, $\eta = 1.23 \times 10^{-4} \mathrm{Mv}^{0.83}$. The intrinsic viscosity [η] is a value obtained by measuring specific viscosities [$\eta_{sp}$] at respective solution concentrations [C] (g/dl), and then being calculated according to Formula below.

$$\eta = \lim_{c \to 0} \eta_{sp}/c \qquad \text{[Mathematical formula 1]}$$

The terminal hydroxyl group concentration of the polycarbonate resin is arbitrary, and may appropriately be selected and determined. It is generally 1000 ppm or less, preferably 800 ppm less, and more preferably 600 ppm or less. This can improve the retention heat stability and the hue of the polycarbonate resin composition of the invention. On the other hand, the lower limit value thereof is, particularly of the polycarbonate resins produced by the melt transesterification method, generally 10 ppm or more, preferably 30 ppm or more, and more preferably 40 ppm or more. This can suppress the lowering of the molecular weight, to thereby improve the mechanical property of the polycarbonate resin composition of the invention.

Meanwhile, the unit of the terminal hydroxyl group concentration is represented by the weight of the terminal hydroxyl groups, relative to the weight of the polycarbonate resin in ppm. The measurement method thereof is a colorimetric quantitative determination by a titanium tetrachloride/acetic acid method (the method described in Macromol. Chem. 88 215 (1965)).

The polycarbonate resin may be used in a form of the polycarbonate resin alone (the phrase "polycarbonate resin alone" is used within the meaning including not only a limited mode of containing only one kind of polycarbonate resin, but also a mode of containing, for example, plural kinds of polycarbonate resins having different monomer compositions or molecular weights each other), or in a form of a combination of the polycarbonate resin and an alloy (mixture) with another thermoplastic resin. Further, the polycarbonate resin may be constituted as a copolymer having the polycarbonate resin as the main constituent such as a copolymer with an oligomer or polymer having a siloxane structure for further enhancing the flame resistance or impact resistance; a copolymer with a monomer, oligomer or polymer having a phosphorous atom for further enhancing a thermal oxidation stability or flame resistance; a copolymer with a monomer, oligomer or polymer having a dihydroxyanthraquinone structure for enhancing the thermal oxidation stability; a copolymer with an oligomer or polymer having an olefin-based structure such as polystyrene for improving the optical property; and a copolymer with a polyester resin oligomer or polymer for enhancing chemical resistance; etc.

Moreover, the polycarbonate resin may contain a polycarbonate oligomer for enhancing the external appearance of molded articles or the flowability. The viscosity-average molecular weight [Mv] of the polycarbonate oligomer is generally 1500 or more, preferably 2000 or more, and generally 9500 or less, preferably 9000 or less. Furthermore, the polycarbonate oligomer is preferably contained in 30% by mass or less, relative to the polycarbonate resin (including the polycarbonate oligomer).

Furthermore, the polycarbonate resin may be not only virgin materials, but also a polycarbonate resin recycled from products used (so-called material-recycled polycarbonate resin). Examples of the used products include optically recording media such as optical disks; light guide plates; transparent members for vehicles such as window glass for automobiles, head lamp lenses for automobiles and windshields; vessels such as water bottles; lenses for eyewear; building components such as sound barriers, glass windows and corrugated sheets; etc. In addition, usable materials include pulverized materials obtained from nonconforming products, sprue, runner etc., pellets obtained by melting these, etc.

But, the amount of the regenerated polycarbonate resin is preferably 80% by mass or less, more preferably 50% by mass or less, in the polycarbonate resin contained in the polycarbonate resin composition of the invention. The regenerated polycarbonate resin may suffer deteriorations such as thermal deterioration or deterioration with age with a high possibility, and, therefore, when such polycarbonate resin is used exceeding the above-mentioned range, the hue or the mechanical property may be deteriorated.

3. Metal Organic Sulfonate

The polycarbonate resin composition of the invention contains a metal organic sulfonate. The incorporation of the metal organic sulfonate can improve the flame resistance of the polycarbonate resin composition of the invention.

Examples of the metals contained in the metal organic sulfonate include alkali metals such as lithium (Li), sodium (Na), potassium (K), rubidium (Rb) and cesium (Cs); alkali earth metals such as magnesium (Mg), calcium (Ca), strontium (Sr) and barium (Ba); and aluminum (Al), titanium (Ti), iron (Fe), cobalt (Co), nickel (Ni), copper (Cu), zinc (Zn), zirconium (Zr), molybdenum (Mo), etc. Of those, an alkali metal or an alkali earth metal is preferable. Because, they can accelerate the formation of a carbonized layer at the burning of the polycarbonate resin composition of the invention to further enhance the flame resistance, and can satisfactorily maintain such natures as mechanical properties such as impact resistance, heat-resistance, and electric characteristics which a polycarbonate resin has. Accordingly, as the metal organic sulfonate, more preferable is at least one metal salt compound selected from the group consisting of alkali metal salts and alkali earth metal salts, furthermore preferable is an alkali metal salt, and the metal is preferably sodium, potassium or cesium.

Examples of the metal organic sulfonates include lithium (Li) organic sulfonate, sodium (Na) organic sulfonate, potassium (K) organic sulfonate, rubidium (Rb) organic sulfonate, cesium (Cs) organic sulfonate, magnesium (Mg) organic sulfonate, calcium (Ca) organic sulfonate, strontium (Sr) organic sulfonate, barium (Ba) organic sulfonate, etc. Of those, in particular, alkali metal organic sulfanates are preferable, including sodium (Na) organic sulfonate, potassium (K) organic sulfonate compounds, cesium (Cs) organic sulfonate compounds, etc.

Preferred examples of the metal organic sulfonates include metal salts of fluorine-containing aliphatic sulfonic acid, metal salts of fluorine-containing aliphatic sulfonimide, metal salts of aromatic sulfonic acid, and metal salts of aromatic sulfonamide. Specific examples of preferred ones thereof include alkali metal salts of fluorine-containing aliphatic sulfonic acids having at least one C—F bond in the molecule such as potassium perfluorobutane sulfonate, lithium perfluorobutane sulfonate, sodium perfluorobutane sulfonate, cesium perfluorobutane sulfonate, lithium trifluoromethane sulfonate, sodium trifluoromethane sulfonate, potassium trifluoromethane sulfonate, potassium perfluoroethane sulfonate and potassium perfluoropropane sulfonate;

alkali earth metal salts of fluorine-containing aliphatic sulfonic acids having at least one C—F bond in the molecule such as magnesium perfluorobutane sulfonate, calcium perfluorobutane sulfonate, barium perfluorobutane sulfonate, magnesium trifluoromethane sulfonate, calcium trifluoromethane sulfonate, and barium trifluoromethane sulfonate;

metal salts of fluorine-containing aliphatic sulfonic acids such as alkali metal salts of fluorine-containing aliphatic disulfonic acids having at least one C—F bond in the molecule such as disodium perfluoromethane disulfonate, dipotassium perfluoromethane disulfonate, sodium perfluoroethane disulfonate, dipotassium perfluoroethane disulfonate, dipotassium perfluoropropane disulfonate, dipotassium perfluoroisopropane disulfonate, disodium perfluorobutane disulfonate, dipotassium perfluorobutane disulfonate and dipotassium perfluorooctane disulfonate;

alkali metal salts of fluorine-containing aliphatic disulfonimides having at least one C—F bond in the molecule such as lithium bis(perfluoropropanesulfonyl)imide, sodium bis(perfluoropropanesulfonyl)imide, potassium bis(perfluoropropanesulfonyl)imide, lithium bis(perfluorobutanesulfonyl)imide, sodium bis(perfluorobutanesulfonyl)imide, potassium bis(perfluorobutanesulfonyl)imide, potassium trifluoromethane(pentafluoroethane)sulfonylimide, sodium trifluoromethane(nonafluorobutane)sulfonylimide, potassium trifluoromethane(nonafluorobutane)sulfonylimide, trifluoromethane, etc.;

metal salts of fluorine-containing aliphatic sulfonimides such as alkali metal salts of cyclic fluorine-containing aliphatic sulfonimides having at least one C—F bond in the molecule such as lithium cyclo-hexafluoropropane-1,3-bis(sulfonyl)imide, sodium cyclo-hexafluoropropane-1,3-bis(sulfonyl)imide, and potassium cyclo-hexafluoropropane-1,3-bis(sulfonyl)imide;

alkali metal salts of aromatic sulfonates having at least one aromatic group in the molecule such as dipotassium diphenylsulfone-3,3'-disulfonate, potassium diphenylsulfone-3-sulfonate, sodium benzene sulfonate, sodium (poly)styrene sulfonate, sodium paratoluene sulfonate, sodium (branched) dodecylbenzene sulfonate, sodium trichlorobenzene sulfonate, potassium benzene sulfonate, potassium styrene sulfonate, potassium (poly)styrene sulfonate, potassium paratoluene sulfonate, potassium (branched)dodecylbenzene sulfonate, potassium trichlorobenzene sulfonate, cesium benzene sulfonate, cesium (poly)styrene sulfonate, cesium paratoluene sulfonate, cesium (branched)dodecylbenzene sulfonate, and cesium trichlorobenzene sulfonate;

metal salts of aromatic sulfonic acids such as alkali earth metal salts of aromatic sulfonates having at least one aromatic group in the molecule such as magnesium paratoluene sulfonate, calcium paratoluene sulfonate, strontium paratoluene sulfonate, barium paratoluene sulfonate, magnesium (branched)dodecylbenzene sulfonate and calcium branched) dodecylbenzene sulfonate; and metal salts of aromatic sulfonamides such as alkali metal salts of aromatic sulfonamides having at least one aromatic group in the molecule such as sodium salt of saccharin, potassium salt of N-(p-tolylsulfonyl)-p-toluene sulfoimide, potassium salt of N-(N'-banzylaminocarbonyl)sulfanilimide and potassium salt of N-(phenylcarboxyl)-sulfanilimide.

Of those, more preferable are metal salts of fluorine-containing aliphatic sulfonic acids and metal salts of aromatic sulfonic acids, and particularly preferable are metal salts of fluorine-containing aliphatic sulfonic acids.

As the metal salt of fluorine-containing aliphatic sulfonic acids, preferable are alkali metal salts of fluorine-containing aliphatic sulfonic acids having at least one C—F bond in the molecule, particularly preferable are alkali metal salts of perfluoroalkane sulfonic acids. Specifically, potassium perfluorobutane sulfonate etc. are preferable. As metal salts of aromatic sulfonic acids, more preferable are alkali metal salts of aromatic sulfonic acids, particularly preferable are alkali metal salts of diphenylsulfone-sulfonic acid such as dipotassium diphenylsulfone-3,3'-disulfonate, and potassium diphenylsulfone-3-sulfonate; and alkali metal salts of paratoluene sulfonic acid such as sodium paratoluene sulfonate, potassium paratoluene sulfonate and cesium paratoluene sulfonate; and furthermore preferable are alkali metal salts of paratoluene sulfonic acid.

Meanwhile, the metal organic sulfonate may be used in one kind, or in two or more kinds at an arbitrary combination and a ratio.

As the metal organic sulfonate for use in the invention, polymer type metal organic sulfonates may be employed, in addition to above-mentioned metal organic sulfonates. Examples of the polymer type metal organic sulfonates include metal salts having an alkali metal sulfonate residue in thermoplastic resins such as polystyrene, polyacrylonitrile-styrene, polycarbonate or polyethylene terephthalate.

The content of the metal organic sulfonate in the polycarbonate resin composition of the invention is, relative to 100 parts by mass of the polycarbonate resin, 0.001 part by mass or more, preferably 0.01 part by mass or more, more preferably 0.03 parts by mass or more, particularly preferably 0.05 parts by mass or more, and 2 parts by mass or less, preferably 1 part by mass or less, more preferably 0.5 parts by mass or less, particularly preferably 0.3 parts by mass or less. When the content of the metal organic sulfonate is too small, the flame resistance of the polycarbonate resin composition to be obtained may be insufficient, and, inversely, when the content thereof is too much, the thermal stability of the polycarbonate resin may deteriorate, and the external appearance thereof may be poor, and the mechanical strength of the molded articles may deteriorate.

4. Fluoropolymer

No limitation is imposed on the kind of fluoropolymer for use in the polycarbonate resin composition of the invention. Moreover, the fluoropolymer may be used in one kind, or in two or more kinds at an arbitrary combination and a ratio.

As the fluoropolymer, for example, fluoroolefin resin is exemplified. The fluoroolefin resin is generally a polymer or a copolymer containing a fluoroethylene structure. Specific examples thereof include difluoroethylene resin, tetrafluoroethylene resin, tetrafluoroethylene/hexafluoropropyrene copolymer resin, tetrafluoroethylene/perfluoroalkylvinyl ether copolymer resin, etc. Of those, preferably tetrafluoroethylene resin etc. are exemplified. As the fluoroethylene resin, a fluoroethylene resin capable of forming fibril is exemplified.

Examples of the fluoroethylene resins capable of forming fibril include "Teflon (registered trade mark) 6J" and "Teflon (registered trade mark) 640J" manufactured by DU PONT-MITSUI FLUOROCHEMICALS, "POLYFLON F201L," "POLYFLON F103" and "POLYFLON FA500B" manufactured by Daikin Industries, Ltd., etc. In addition, as commercial products of an aqueous dispersion liquid of the fluoroethylene resin, there are "Teflon (registered trade mark) 30J" and "Teflon (registered trade mark) 31-JR" manufactured by DU PONT-MITSUI FLUOROCHEMICALS, "Fluon D-1" manufactured by Daikin Industries, Ltd., etc. Furthermore, fluoroethylene polymer having a multi-layer structure formed by polymerizing a vinyl-based monomer can also be employed. Examples of such fluoroethylene polymers include a polystyrene-fluoroethylene composite, a polystyrene-acrylonitrile-fluoroethylene composite, a polymethyl methacrylate-fluoroethylene composite, a polybutyl methacrylate-fluoroethylene composite, etc., and specific examples include "Metablen A-3800" manufactured by Mitsubishi Rayon Co., Ltd., "BLENDEX 449" manufactured by GE Specialty Chemicals, etc. Meanwhile, a dropping inhibitor may be incorporated in one kind, or in two or more kinds at an arbitrary combination and a ratio.

The content of fluoropolymer is, relative to 100 parts by mass of polycarbonate resin, generally 0.001 part by mass or more, preferably 0.01 part by mass or more, more preferably 0.05 parts by mass or more, particularly preferably 0.1 part by mass or more, and, generally 1 part by mass or less, preferably 1 part by mass or less, more preferably 0.75 parts by mass or less. The fluoropolymer content less than the lower limit value of the above-mentioned range may cause an insufficient flame resistance due to the dropping inhibitor, the dropping inhibitor content exceeding the upper limit value of the range may be poor in the external appearance and deteriorates the mechanical strength of molded articles molded from the polycarbonate resin composition.

5. Polyalkylsilsesquioxane Particle

The polycarbonate resin composition of the invention contains polyalkylsilsesquioxane particles. The simultaneous incorporation of the polyalkylsilsesquioxane particle with the above-mentioned metal organic sulfonate in this way can improve the flame resistance of the polycarbonate resin composition of the invention.

Moreover, generally, the incorporation of particles in a polycarbonate resin tends to deteriorate the impact resistance, but, in the polycarbonate resin composition of the invention, surprisingly, the incorporation of the polyalkylsilsesquioxane particle can improve even the impact resistance and the long-term physical properties. It is considered to be attributed to a favorable adherence of the polyalkylsilsesquioxane relative to the polycarbonate resin, that is, when a shock is added, a void generates by interfacial peeling and the void plays a role of stopping the crack, thereby working, consequently, as an elastomer.

Polyalkylsilsesquioxane in the invention means a polyorganosiloxane having a trifunctional siloxane unit represented by $RSiO_{1.5}$ (R is a monovalent organic group) (hereinafter, it may be referred to as a "T unit"), and contains the unit, in 100% by mol of the total siloxane units (M unit, D unit, T unit, Q unit), in 90% by mol or more, more preferably in 95% by mol or more, furthermore preferably in 100% by mol.

Meanwhile, the M unit represents a monofunctional siloxane unit represented by $R_3SiO_{0.5}$ (R is a monovalent organic group), the D unit represents a bifunctional siloxane unit represented by $R_2SiO_{1.0}$ (R is a monovalent organic group), and the Q unit represents a tetrafunctional siloxane unit represented by $SiO_{2.0}$ (R is a monovalent organic group).

The polyalkylsilsesquioxane particle in the invention may contain an M unit, in addition to the T unit. The incorporation of the M unit in this way may improve the heat-resistance of the polyalkylsilsesquioxane particle itself, and may make the thermal stability and the hue of the polycarbonate resin composition of the invention better.

Examples of the organic group R bonded to the polyalkylsilsesquioxane include preferably alkyl groups having 1 to 20 carbon atoms such as a methyl group, an ethyl group, a propyl group, a butyl group, a hexyl group, a decyl group, an octyl group, a dodecyl group and an octadecyl group. Of those, as the organic group R, a methyl group is preferable, because it tends to improve the heat-resistance of the polyalkylsilsesquioxane itself, and to improve the thermal stability of the polycarbonate resin of the invention.

The polyalkylsilsesquioxane for use in the invention has an average particle diameter of generally 0.6 μm or more, preferably 0.7 μm or more, more preferably 1 μm or more, and generally 5 μm or less, preferably 4 μm or less, more preferably 3 μm or less. A polyalkylsilsesquioxane having an average particle diameter of less than 0.6 μm has a raised agglutinative property and shows an inferior dispersibility into the polycarbonate resin, to thereby tend to deteriorate the flame resistance, unpreferably. On the other hand, those having an average particle diameter exceeding 5 μm are unfavorable because those tend to deteriorate impact resistance of the polycarbonate resin composition of the invention, and to be poor in the external appearance. Furthermore, the polyalkylsilsesquioxane unfavorably tends to give a significantly diminished surface area to thereby tend to deteriorate the flame resistance. It is considered that the mechanism of improving the flame resistance of the polycarbonate resin composition of the invention is based on that the above-mentioned metal organic sulfonate reacts specifically with butadiene of a graft copolymer to be described later on the surface of the polyalkylsilsesquioxane particles to thereby improve the flame resistance.

Meanwhile, in the invention, as the average particle diameter of the polyalkylsilsesquioxane particles, the volume-average particle diameter measured by the Coulter counter method is adopted. In the Coulter counter method, an electrolyte in which sample particles are suspended is allowed to pass through a minute pore (aperture), and the variation of voltage pulse generating in proportion to the volume of a particle is read to determine quantitatively the particle diameter. Moreover, the height of the voltage pulse can be measured and processed one by one to thereby give a volume distribution histogram of the sample particles. Such a measurement of particle diameters or particle diameter distribution by the Coulter counter method is most frequently utilized in particle diameter measurement apparatuses.

In the invention, the particle diameter measurement of the polyalkylsilsesquioxane particle is carried out using a particle diameter distribution measurement apparatus Multisizer 4 of BECKMAN COULTER under such conditions as a dispersion medium of ISOTON II, an aperture diameter of 20 μm, a dispersing agent of ethanol, and an ultrasonic treatment of 3 min. Moreover, in the measurement, in order to eliminate the influence of extremely small minute particles and extremely large maximum particles to thereby guarantee data having a high reliability and a high reproducibility, the particle diameter is defined by carrying out the measurement in the diameter range of 0.4 to 12 μm.

Preferable polyalkylsilsesquioxanes as described above can be produced by a publicly known method. For example, as described in JP-A-01-217039, JP-A-5-125187 or JP-A-6-263875, it is obtained by hydrolyzing organotrialkoxysilane under an acidic condition, adding and mixing an alkali aqueous solution to aqueous or aqueous/organic solvent of organosilanetriol, and leaving the product in a static state to thereby polycondensate the organosilanetriol.

The particle diameter can mainly be adjusted by adjusting the pH of the aqueous solution of alkali. When small particles are to be obtained, the pH is adjusted to be a high value, and when large particles are to be obtained, the pH is adjusted to be a low value, thereby making the adjustment of the particle diameter possible. The condensation reaction is generally carried out in a range of 0.5 to 10 hr, preferably 0.5 to 5 hr after the addition of the alkali, and the condensate is ripened. The particle diameter and the particle diameter distribution can be adjusted by mildly stirring it in the ripening to thereby prevent the particles from associating. Moreover, the particle size may be adjusted by further pulverizing obtained polyorganosiloxane particles. Furthermore, the polyalkylsilsesquioxane particle may be available from a manufacturer thereof by specifying the speculation of intended diameter and diameter distribution of particles.

The content of the polyalkylsilsesquioxane particle is, relative to 100 parts by mass of polycarbonate resin, generally 0.5 parts by mass or more, preferably 0.75 parts by mass or more, more preferably 1 part by mass or more, and generally 5 parts by mass or less, preferably 4 parts by mass or less, more preferably 3.5 parts by mass or less. When the content of the polyalkylsilsesquioxane particle is less than the lower limit value of the range, the effect of improving the flame resistance may be insufficient, and when the content of the polyalkylsilsesquioxane particle exceeds the upper limit value of the range, the flame resistance also tends to deteriorate, in addition to the possibility of generation of poor external appearance of articles molded from the polycarbonate resin composition or the deterioration of the impact resistance.

6. Graft Copolymer

The polycarbonate resin composition of the invention contains a graft copolymer containing an intended amount of butadiene. By incorporating such a graft copolymer, the impact resistance of the polycarbonate resin composition of the invention is improved, and, furthermore, by incorporating the copolymer simultaneously with the above-mentioned metal organic sulfonate and the polyalkylsilsesquioxane particles, surprisingly, the flame resistance can be improved. Conventionally, graft copolymers containing butadiene were combustible and a so-called additive having an inferior flame resistance, and the blending thereof in a polycarbonate resin deteriorated the flame resistance. However, in the polycarbonate resin composition of the invention, by setting the butadiene content in the graft copolymer to be an intended amount, and, furthermore, by combining the metal organic sulfonate with the polyalkylsilsesquioxane particles, the flame resistance can remarkably be improved.

The graft copolymer of the invention is formed by graft-copolymerizing a rubber component containing at least a butadiene component with a monomer component copolymerizable therewith. The rubber component has a glass transition temperature of generally 0° C. or less, preferably −20° C. or less, more preferably −30° C. or less. Specific examples of the rubber components include polyalkyl acrylate rubbers such as polybutadiene rubber, polyisoprene rubber, polybutyl acrylate, poly(2-ethylhexyl acrylate), butyl acrylate/2-ethylhexyl acrylate copolymer; silicone-based rubbers such as polyorganosiloxane rubber; butadiene-acrylic composite rubber; IPN type composite rubber consisting of polyorganosiloxane rubber and polyalkyl acrylate rubber; ethylene-α-olefin-based rubbers such as styrene-butadiene rubber, ethylene-propylene rubber, ethylene-butene rubber and ethylene-octene rubber; ethylene-acrylic rubber; fluorine-containing rubber; etc.

These may be used alone, or in combination of two or more. But, the butadiene must be contained in a prescribed amount.

Of those, from the standpoint of the mechanical properties and surface appearance, polybutadiene rubber and styrene-butadiene rubber are preferable.

Specific examples of the monomer components graft-copolymerizable with the rubber component include epoxy group-containing (meth)acrylic acid ester compounds such as aromatic vinyl compounds, vinyl cyanide compounds, (meth)acrylic acid ester compounds, (meth)acrylic acid compounds and glycidyl(meth)acrylate; maleimide compounds such as maleimide, N-methyl maleimide and N-phenyl maleimide; α,β-unsaturated carboxylic acid compounds such as maleic acid, phthalic acid and itaconic acid and anhydrides thereof (for example, maleic anhydride, etc.); etc. These monomer components may be used in one kind alone, or in two or more kinds in combination.

Of those, from the standpoints of the mechanical properties and the surface appearance, preferable are aromatic vinyl compounds, vinyl cyanide compounds, (meth)acrylic acid ester compounds and (meth)acrylic acid compounds, and more preferable are (meth)acrylic acid ester compounds. Specific examples of the (meth)acrylic acid ester compounds include methyl (meth)acrylate, ethyl(meth)acrylate, butyl (meth)acrylate, cyclohexyl(meth)acrylate, octyl(meth)acrylate, etc.

Specific examples of preferable graft copolymers include methyl methacrylate-butadiene-styrene copolymer (MBS), methyl methacrylate-acrylonitrile-butadiene-styrene copolymer (MABS), acrylonitrile-butadiene-styrene copolymer (ABS), methyl methacrylate-butadiene copolymer (MB), methyl methacrylate-acrylic/butadiene rubber copolymer, methyl methacrylate-acrylic/butadiene rubber-styrene copolymer, etc. Such rubber copolymers may be used in one kind alone, or in two or more kinds in combination.

As the graft copolymer for use in the invention, core/shell type graft copolymers are preferable from the standpoints of the impact resistance and the surface appearance. Of those, particularly preferable is a core/shell type graft copolymer comprising a core layer formed from a polybutadiene-containing rubber and a shell layer formed by copolymerizing a (meth)acrylic acid ester around the core layer.

Meanwhile, as the method for producing the graft copolymer, any of bulk polymerization, solution polymerization, suspension polymerization, emulsification polymerization etc. may be utilized, and the system of copolymerization may be a single stage grafting or multistage grafting.

The content of the butadiene in the graft copolymer of the invention is generally 50% by mass or more, preferably 55% by mass or more, more preferably 70% by mass or more, and generally 95% by mass or less, preferably 90% by mass or less, more preferably 85% by mass or less. By setting the butadiene content so as to fall within the above-mentioned range, the flame resistance and the impact resistance can dramatically be improved.

When the content of the butadiene is less than the lower limit value, the effect of improving the flame resistance may be insufficient, and when the butadiene content exceeds the upper limit value of the range, the dispersibility of the graft copolymer into the polycarbonate resin extremely deteriorates, which may deteriorate the impact resistance of the polycarbonate resin composition of the invention, or be poor in the external appearance.

Examples of such graft copolymers include ABS resins such as "CHT" manufactured by Cheil Industries Inc. and "B602" manufactured by UMG ABS, Ltd.; and core/shell type graft copolymers such as "Paraloid EXL2602," "Paraloid EXL2603" and "Paraloid EXL2655" manufactured by Rohm and Haas JAPAN K.K., "Metablen C-223A" and "Metablen E-901" manufactured by Mitsubishi Rayon Co., Ltd., "Stafiloid IM-601" manufactured by GANZ CHEMICAL CO., LTD., "Kane Ace M-511" and "Kane Ace M-600" manufactured by Kaneka Corporation.

The content of the graft copolymer is, relative to 100 parts by mass of the polycarbonate resin, generally 0.5 parts by mass or more, preferably 1 part by mass or more, more preferably 1.5 parts by mass or more, and generally 8 parts by mass or less, preferably 7 parts by mass or less, more preferably 6 parts by mass or less, particularly preferably 8 parts by mass or less, most preferably 4.5 parts by mass or less. When the content of the graft copolymer is less than the lower limit value of the range, the effect of improving the flame resistance and the impact resistance due to the graft copolymer may be insufficient, and when the content of the graft copolymer exceeds the upper limit value of the range, the flame resistance, the heat-resistance or the impact resistance deteriorates, or articles molded from the polycarbonate resin composition may be poor in the external appearance thereof.

In the composition of the invention, the content ratio (mass ratio) of the polyalkylsilsesquioxane particle (ID) and the graft copolymer (E) is preferably 1:0.5 to 1:6, more preferably 1:0.8 to 1:2.5. By setting the ratio to such a range, a desired flame resistance can be ensured, while attaining shock properties.

7. Carbon Black (F)

For the carbon black (F) for use in the invention, no limitation is imposed on the production method, raw materials, etc., and any of conventionally publicly know ones can be used, including, for example, oil furnace black, channel black, acetylene black, ketjen black, etc. Of those, oil furnace black is preferable, from the standpoints of the coloring properties and the cost.

The average particle diameter of the carbon black for use in the invention may be appropriately selected and determined, and, of those, preferable is 5 to 60 nm, more preferable is 7 to 55 nm, and particularly preferable is 10 to 50 nm. The average particle diameter set so as to fall within the range tends to suppress the agglutination of the carbon black, and to improve the external appearance. Meanwhile, the average particle diameter of a carbon black can be obtained using a transmission electron microscope.

The specific surface area by nitrogen adsorption of the carbon black used in the invention is preferably less than 1000 $m^2/g$ in general, more preferably 50 to 400 $m^2/g$. The specific surface area by nitrogen adsorption set to be less than 1000 $m^2/g$ tends to improve the flowability of the polycarbonate resin composition of the invention and the external appearance of molded articles, preferably. Meanwhile, the specific surface area by nitrogen adsorption can be measured in accordance with JIS K6217 (unit is $m^2/g$).

The DBP absorption amount of the carbon black is preferably less than 300 $cm^3/100$ g, more preferably 30 to 200 $cm^3/100$ g. The DBP absorption amount set to be less than 300 $cm^3/100$ g is favorable because it tends to improve the flowability of the polycarbonate resin composition of the invention and the external appearance of molded articles.

The DBP absorption amount can be measured in accordance with JIS K6217 (unit is $cm^3/100$ g). The pH of the carbon black for use in the invention is also not particularly limited, and is generally 2 to 10, preferably 3 to 9, more preferably 4 to 8.

The carbon black for use in the invention can be used alone, or in two or more kinds in combination. Moreover, the carbon black may be granulated using a binder, and may also be used as a master batch which is melted and kneaded in another resin at a high concentration. The use of the melted and kneaded master batch can achieve improvement of the handleability at the extrusion, and the dispersibility into the resin composition. Examples of the above resins include polystyrene-based resins, polycarbonate-based resins, acrylic-based resins, etc. Preferable examples of the carbon black master batches include a carbon black/polystyrene master batch using polystyrene as the base, and a carbon black-polycarbonate oligomer master batch using polycarbonate oligomer as the base. In the case of a carbon black/ master batch, the content ratio of carbon black is preferably 20 to 50%.

8. Other Components

The polycarbonate resin composition of the invention may contain other components in addition to above-mentioned components, if necessary, as long as they do not significantly ruin intended various properties. In the composition of the invention, 90% by mass or more of the weight of the composition is any one of the above-mentioned (A) to (F) components. Examples of the other components include resins other than polycarbonate resin, various resin additives, etc. Meanwhile, the other component may be contained in one kind, or in two or more kinds at an arbitrary combination and a ratio.

Other Resins

Examples of the other resins include thermoplastic polyester resins such as polyethylene terephthalate resin, polytrimethylene telephthalate and polybutylene telephthalate resin; styrene-based resins such as polystyrene resin, high-impact polystyrene resin (HIPS), acrylonitrile-styrene copolymer (AS resin), acrylonitrile-styrene-acrylic rubber copolymer (ASA resin) and acrylonitrile-ethylenepropylene-based rubber-styrene copolymer (AES resin); polyolefin resins such as polyethylene resin and polypropylene resin; polyamide resin; polyimide resin; polyetherimide resin; polyurethane resin; polyphenylene ether resin; polyphenylene sulfide resin; polysulfone resin; polymethacrylate resin, etc.

Meanwhile, the other resin may be contained in one kind, or in two or more kinds at an arbitrary combination and a ratio.

These resin components exist preferably 10 parts by mass or less, relative to 100 parts by mass of the polycarbonate resin.

Resin Additives

Examples of the resin additives include heat stabilizers, antioxidants, mold-releasing agents, ultraviolet absorbers, dye/pigment, flame retardants, dropping inhibitors, antistatic agents, anti-fogging agents, lubricants, anti-blocking agents, flowability-improving agents, plasticizers, dispersing agents, antibacterial agents, etc. Meanwhile, the resin additive may be contained in one kind, or in two or more kinds at an arbitrary combination and a ratio.

Hereinafter, examples of additives favorable for the polycarbonate resin composition of the invention will be explained specifically.

Heat Stabilizer

Examples of the heat stabilizers include phosphorous-based compounds. As the phosphorous-based compound, any known one may be used. Specific examples include oxo acids of phosphorous such as phosphoric acid, phosphonic acid, phosphorous acid, phosphinic acid and polyphosphoric acid; metal acid pyrophosphates such as sodium acid pyrophosphate, potassium acid pyrophosphate and calcium acid pyrophosphate; phosphates of Group I or Group II metals such as potassium phosphate, sodium phosphate, cesium phosphate and zinc phosphate; organic phosphate compounds, organic phosphite compounds, organic phosphonite compounds etc., and organic phosphite compounds are particularly preferable.

Examples of the organic phosphite compounds include triphenyl phosphite, tris(mononanylphenyl)phosphite, tris(mononanyl/dinonyl phenyl)phosphite, tris(2,4-di-tert-butylphenyl)phosphite, monooctyldiphenyl phosphite, dioctylmonophenyl phosphite, monodecyldiphenyl phosphite, didecylmonophenyl phosphite, tridecyl phosphite, trilauryl phosphite, tristearyl phosphite, 2,2-methylenebis(4,6-di-tert-butylphenyl)octyl phosphite, etc. Specific examples of these organic phosphite compounds include "Adekastab 1178," "Adekastab 2112" and "Adekastab HP-10" manufactured by ADEKA CORPORATION, "JP-351," "JP-360" and "JP-3CP" manufactured by JOHOKU CHEMICAL CO., LTD., "Irgaphos 168" manufactured by Ciba Specialty Chemicals, etc.

Meanwhile, the heat stabilizer may be contained in one kind, or in two or more kinds at an arbitrary combination and a ratio.

The content of the heat stabilizer is, relative to 100 parts by mass of the polycarbonate resin, generally 0.001 part by mass or more, preferably 0.01 part by mass or more, more preferably 0.03 parts by mass or more, and generally 1 part by mass or less, preferably 0.7 parts by mass or less, more preferably 0.5 parts by mass or less. When the content of the heat stabilizer is less than the lower limit value of the range, the effect of heat stability may be insufficient, and when the content of the heat stabilizer exceeds the upper limit value of the range, the effect may reach the upper limit not to be economical.

Antioxidant

As the antioxidant, for example, hindered phenol-based antioxidants are exemplified. Specific examples thereof include pentaerythritoltetrakis[3-(3,5-di-tert-butyl-4-hydroxyphenyl)propionate], octadecyl-3-(3,5-di-tert-butyl-4-hydroxyphenyl)propionate, thiodiethylenebis[3-(3,5-di-tert-butyl-4-hydroxyphenyl) propionate], N,N'-hexane-1,6-diylbis[3-(3,5-di-tert-butyl-4-hydroxyphenyl propionamide), 2,4-dimethyl-6-(1-methylpentadecyl) phenol, diethyl[[3,5-bis(1,1-dimethylethyl)-4-hydroxyphenyl]methyl]phosphate, 3,3',3'',5,5',5''-hexa-tert-butyl-a,a',a''-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-yl amino)phenol, 2-[1-(2-hydroxy-3,5-di-tert-pentylphenyl)ethyl]-4,6-di-tert-pentylphenyl acrylate, etc.

Of those, preferable are pentaerythritoltetrakis[3-(3,5-di-tert-butyl-4-hydroxyphenyl)propionate], and octadecyl-3-(3, 5-di-tert-butyl-4-hydroxyphenyl)propionate. Specific examples of such phenol-based antioxidants include "IRGANOX 1010" and "IRGANOX 1076" manufactured by Ciba Specialty Chemicals, "Adekastab AO-50" and "Adekastab AO-60" manufactured by ADEKA CORPORATION, etc.

Meanwhile, the antioxidant may be contained in one kind, or in two or more kinds at an arbitrary combination and a ratio.

The content of the antioxidant is, relative to 100 parts by mass of the polycarbonate resin, generally 0.001 part by mass or more, preferably 0.01 part by mass or more, and generally 1 part by mass or less, preferably 0.5 parts by mass or less. When the content of the antioxidant is less than the lower limit value of the range, the effect as an antioxidant may be insufficient, and when the content of the antioxidant exceeds the upper limit value of the range, the effect may reach the upper limit not to be economical.

Mold-Releasing Agent

Examples of the mold-releasing agents include aliphatic carboxylic acids, esters of an aliphatic carboxylic acid and an alcohol, aliphatic hydrocarbon compounds having a number-average molecular weight of 200 to 15000, polysiloxane-based silicone oils, etc.

As the aliphatic carboxylic acid, for example, saturated or unsaturated aliphatic mono-, di- or tri-valent carboxylic acids can be exemplified. Here, the aliphatic carboxylic acid includes alicyclic carboxylic acids, too. Of those, preferable aliphatic carboxylic acids are mono- or di-valent carboxylic acids having 6 to 36 carbon atoms, and more preferable are aliphatic saturated monovalent carboxylic acids having 6 to 36 carbon atoms. Specific examples of such aliphatic carboxylic acids include palmitic acid, stearic acid, caproic acid, capric acid, lauric acid, arachidic acid, behenic acid, lignoceric acid, cerotinic acid, melissic acid, tetrariacontanoic acid, montanic acid, adipic acid, azelaic acid, etc.

As the aliphatic carboxylic acid as an ester of an aliphatic carboxylic acid and an alcohol, for example, the same aliphatic carboxylic acid as those described above can be used. On the other hand, examples of the alcohols include saturated or unsaturated mono- or poly-valent alcohols. These alcohols may have a substituent such as a fluorine atom or an aryl group. Of those, preferable are saturated mono- or polyvalent alcohols having 30 or less carbon atoms, and more preferable are aliphatic saturated monovalent alcohols or aliphatic saturated polyvalent alcohols having 30 or less carbon atoms. Here, aliphatic compounds include alicyclic compounds, too.

Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, dipentaerythritol, etc.

Meanwhile, the above-mentioned esters may contain aliphatic carboxylic acids and/or alcohols. Moreover, the esters may be a pure product, or a mixture of plural compounds. Furthermore, aliphatic carboxylic acids and alcohols that are bonded to constitute one ester may be used, respectively, in one kind, or in two or more kinds at an arbitrary combination and a ratio.

Specific examples of the esters formed from an aliphatic carboxylic acid and an alcohol include bees wax (a mixture containing myricyl palmitate as a main component), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, pentaerythritol tetrastearate, etc.

Examples of aliphatic hydrocarbons having a number-average molecular weight of 200 to 15000 include liquid paraffin, paraffin wax, micro wax, polyethylene wax, Fischer-Tropsch wax, α-olefin oligomer having 3 to 12 carbon atoms, etc. Meanwhile, the aliphatic hydrocarbon includes alicyclic hydrocarbons. Moreover, these hydrocarbons may partially be oxidized.

Of those, preferable are paraffin wax, polyethylene wax and a partially oxidized polyethylene wax, and more preferable are paraffin wax and polyethylene wax.

The above-mentioned aliphatic hydrocarbons have a number-average molecular weight of preferably 5000 or less.

Meanwhile, the aliphatic hydrocarbon may be a single material, or a mixture of materials having various constitutional components or molecular weights may be used, as long as the main component thereof falls within above-mentioned scope.

Examples of the polysiloxane-based silicone oils include dimethylsilicone oil, methylphenylsilicone oil, diphenylsilicone oil, fluorinated alkyl silicone, etc.

Meanwhile, the above-mentioned mold-releasing agent may be contained in one kind, or in two or more kinds at an arbitrary combination and a ratio.

The content of the mold-releasing agent is, relative to 100 parts by mass of the polycarbonate resin, generally 0.001 part by mass or more, preferably 0.01 part by mass or more, and generally 2 parts by mass or less, preferably 1 part by mass or less. When the content of the mold-releasing agent is less than the lower limit value of the range, the effect of the mold-releasing property may not be sufficient, and when the content of the mold-releasing agent exceeds the upper limit value of the range, the hydrolysis-resistance, mold pollution in injection molding, or the like may be deteriorated.

Ultraviolet Absorber

Examples of the ultraviolet absorbers include inorganic ultraviolet absorbers such as cerium oxide and zinc oxide; and organic ultraviolet absorbers such as benzotriazole compounds, benzophenone compounds, salicylate compounds, cyanoacrylate compounds, triazine compounds, oxanilide compounds, malonic acid ester compounds, hindered amine compounds, etc. Of those, organic ultraviolet absorbers are preferable, and benzotriazole compounds are more preferable. By selecting the organic ultraviolet absorber, the transparency and mechanical properties of the polycarbonate resin composition of the invention may be enhanced.

Specific examples of the benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl)benzotriazole, 2,2'-methylenebis[4-(1,1,3,3-tetramethylbutyl)-6-(2N-benzotriazole-2-yl)phenol], etc. Of those, preferable are 2-(2'-hydroxy-5'-tert-octylphenyl)benzotriazole and 2,2'-methylenebis[4-(1,1,3,3-tetramethylbutyl)-6-(2N-benzotriazole-2-yl)phenol], and particularly preferable is 2-(2'-hydroxy-5'-tert-octylphenyl)benzotriazole. Specific examples of such benzotriazole compounds include "SEESORB 701," "SEESORB 705," "SEESORB 703," "SEESORB 702," "SEESORB 704" and "SEESORB 709" manufactured by SHIPROKASEI KAISHA. LTD.; "BioSorb 520," "BioSorb 582," "BioSorb 580" and "BioSorb 583" manufactured by KYODO CHEMICAL CO., LTD., "ChemiSorb 71" and "ChemiSorb 72" manufactured by Chemiprokasei Kaisha, Ltd.; "Cyasorb UV5411" manufactured by Cytec Industries Inc.; "LA-32," "LA-38," "LA-36," "LA-34" and "LA-31" manufactured by ADEKA CORPORATION; "TINUVIN P," "TINUVIN 234," "TINUVIN 326," "TINUVIN 327" and "TINUVIN 328" manufactured by Ciba Specialty Chemicals, etc.

Specific examples of the benzophenone compounds include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dyhydroxy-4-methoxybenzophenone, 2,2'-dyhydroxy-4,4'-dimethoxybenzophenone, etc. Examples of such benzophenone compounds include, specifically, "SEESORB 100," "SEESORB 101," "SEESORB 1015," "SEESORB 102" and "SEESORB 103" manufactured by SHIPROKASEI KAISHA. LTD.; "BioSorb 100," "BioSorb 110" and "BioSorb 130" manufactured by KYODO CHEMICAL CO., LTD.; "ChemiSorb 10," "ChemiSorb 11," "ChemiSorb 11S," "ChemiSorb 12," "ChemiSorb 13" and "ChemiSorb 111" manufactured by Chemiprokasei Kaisha, Ltd.; "Uvinul 400," "Uvinul M-40" and "Uvinul MS-40" manufactured BY BASF LTD.; "Cyasorb UV9," "Cyasorb UV284," "Cyasorb UV531" and "Cyasorb UV24" manufactured by Cytec Industries Inc.; "Adekastab 1413" and "Adekastab LA-51" manufactured by ADEKA CORPORATION, etc.

Specific examples of the salicylate compounds include phenyl salicylate, 4-tert-butylphenyl salicylate, etc. Examples of such salicylate compounds include, specifically, "SEESORB 201" and "SEESORB 202" manufactured by SHIPROKASEI KAISHA. LTD., "ChemiSorb 21" and "ChemiSorb 22" manufactured by Chemiprokasei Kaisha, Ltd., etc.

Specific examples of the cyanoacrylate compounds include ethyl-2-cyano-3,3-diphenyl acrylate, 2-ethylhexyl-2-cyano-3,3-diphenylacrylate, etc. Examples of such cyanoacrylate compounds include, specifically, "SEESORB 501" manufactured by SHIPROKASEI KAISHA. LTD.; Bio-Sorb 910" manufactured by KYODO CHEMICAL CO., LTD.; "UVISOLATER 300" manufactured by DAIICHI KASEI CO., LTD.; "Uvinul N-35" and "Uvinul N-539" manufactured by BASF LTD., etc.

Examples of the triazine compounds include compounds having a 1,3,5-triazine skeleton, etc. Specific examples of such triazine compounds include "LA-46" manufactured by ADEKA CORPORATION, "TINUVIN 1577ED," "TINUVIN 400," "TINUVIN 405," "TINUVIN 460," "TINUVIN 477-DW" and "TINUVIN 479" manufactured by Ciba Specialty Chemicals, etc.

Specific examples of the oxanilide compounds include 2-ethoxy-2'-ethyloxanilic acid bisanilide, etc. Examples of such oxanilide compounds include, specifically, "Sanduvor VSU" manufactured by Clariant.

As the malonic acid ester compound, preferable are 2-(alkylidene)malonic acid esters, and more preferable are 2-(1-arylalkylidene)malonic acid esters. Specific examples of such malonic acid ester compounds include "PR-25" manufactured by Clariant Japan, "B-CAP" manufactured by Ciba Specialty Chemicals, etc.

The content of the ultraviolet absorber is, relative to 100 parts by mass of the polycarbonate resin, generally 0.01 part by mass or more, preferably 0.1 part by mass or more, and generally 3 parts by mass or less, preferably 1 part by mass or less. When the content of the ultraviolet absorber is less than the lower limit value of above-mentioned range, the effect of improving the weather resistance may be insufficient, and when the content of the ultraviolet absorber exceeds the upper limit value of the range, mold deposit etc. may generate to thereby cause the mold pollution. Meanwhile, the ultraviolet absorber may be contained in one kind, or in two or more kinds at an arbitrary combination and a ratio.

Dye/Pigment

As the dye/pigment, for example, inorganic pigment, organic pigment, organic dye, etc. are exemplified.

Examples of the inorganic pigments include sulfide-based pigments such as Cadmium Red and Cadmium Yellow; silicate-based pigments such as ultramarine blue; oxide-based pigments such as titanium oxide, zinc oxide, red iron oxide, chromium oxide, iron black, titanium yellow, zinc-iron-based brown, titanium cobalt-based green, cobalt green, cobalt blue, copper-chromium-based black and copper-iron-based black; chromic acid-based pigments such as chrome yellow and molybdate orange; ferrocyanide-based pigment such as iron blue; etc.

Examples of the organic pigments and organic dyes include phthalocyanine-based dyes/pigments such as copper phthalocyanine blue and copper phthalocyanine green; azo-based dyes/pigments such as nickel azo yellow; condensed polycyclic dyes/pigments such as thioindigo-based, perinone-based, perylene-based, quinacridone-based, diox-azine-based, isoindolinone-based, quinophthalone-based dyes/pigments; anthraquinone-based, heterocyclic-based, methyl-based dyes/pigments; etc.

Of those, preferable are titanium oxide, cyanine-based, quinoline-based, anthraquinone-based, phthalocyanine-based compounds etc., from the standpoint of the thermal stability. Meanwhile, the dye/pigment may be contained in one kind, or in two or more kinds at an arbitrary combination and a ratio.

The content of the dye/pigment is, relative to 100 parts by mass of the polycarbonate resin, generally 5 parts by mass or less, preferably 3 parts by mass or less, and more preferably 2 parts by mass or less. When the content of the dye/pigment is too large, the impact resistance may be insufficient.

8. Method for Producing Polycarbonate Resin Composition

No limitation is imposed on the method for producing the polycarbonate resin composition of the invention, and publicly known methods for producing the polycarbonate resin composition can generally be employed.

As a specific example, a method is exemplified in which a polycarbonate resin, a metal organic sulfonate, a fluoropolymer, a polyalkylsilsesquioxane and a graft copolymer according to the invention, and other components to be blended if necessary are previously mixed using various kinds of mixing machines such as a tumbler mixer or a Henschel mixer, and, after that, are melted and kneaded with a mixing machine such as a Banbury mixer, rolls, Brabender, a single-screw kneading extruder or a double-screw kneading extruder.

It is also possible to produce the polycarbonate resin composition of the invention, for example, by not mixing previously respective components, or mixing previously only a part of components, which are fed to an extruder using a feeder to be melted and kneaded.

In addition, it is also possible to produce the polycarbonate resin composition of the invention, for example, by using a resin composition obtained by mixing previously a part of components and feeding them to an extruder to be melted and kneaded as a master batch, and by mixing again the master batch with other components to be melted and kneaded.

Furthermore, for example, when a component hard to disperse is mixed, it is also possible to enhance the dispersibility thereof by dissolving or dispersing previously the component that is hard to disperse, in a solvent such as water or an organic solvent and carrying out the kneading with the solution or dispersion liquid.

9. Molded Article

The polycarbonate resin composition of the invention is, generally, molded into an arbitrary shape and used as a molded article (resin composition molded article). No limitation is imposed on the shape, pattern, color, dimension, etc. of the molded article, and they may arbitrarily be set corresponding to the application of the molded article.

Examples of the molded articles include parts of electric/electronic devices, OA devices and information terminal devices, machine parts, household electrical appliances, vehicle parts, building members, various vessels, leisure supplies/sundries, lighting devices, gauges, etc. Of those, in particular, the molded articles are favorably used for parts of electric/electronic devices, OA devices, information terminal devices, household electrical appliances, lighting devices, etc., and are particularly favorably used for parts of electric/electronic devices.

Examples of the electric/electronic devices include personal computers, game machines, display devices such as televisions, printers, copiers, scanners, faxes, electronic notebooks and PDA, electronic desk calculators, electronic dictionaries, cameras, video cameras, mobile phones, battery packs, driving devices and reading devices of a recording medium, mice, numeric keypads, CD players, MD players, portable radios/audio players, etc.

Of those, polycarbonate resin molded articles of the invention are favorably used for electric/electronic device bodies, because of an excellent impact resistance. Moreover, they can favorably be used for electric/power source peripheral devices such as battery packs, chargers, power source adapters, power source taps, etc., because of excellent long-term deterioration-resistant properties.

No particular limitation is imposed on the method for producing the molded articles, and any molding method can be employed from those generally employed for the polycarbonate resin composition. Examples thereof include an injection molding method, an ultrahigh-speed injection molding method, an injection compression molding method, a two-color molding method, a hollow molding method such as gas-assisted molding, a molding method using an insulated mold, a molding method using a rapid heating mold, a foam molding (including a supercritical fluid, too), an insert molding, an IMC (in-mold coating) molding method, an extrusion molding method, a sheet molding method, a heat molding method, a rotation molding method, a laminate molding method, a press molding method, etc. A molding method using a hot runner system can also be employed.

As described above, the obtained molded articles of the invention can be used as a practical molded article having a high flame resistance and mechanical property, without damaging excellent properties of polycarbonate resin.

EXAMPLES

Hereinafter, the present invention will be explained more specifically with reference to Examples. But, the invention is not limited to Examples below. It may be brought into practice with arbitrary changes within a scope that does not deviate from the gist of the invention. Meanwhile, in the explanation below, "part" represents "part by mass" based on the mass standard, unless otherwise specified.

Production of Resin Pellet

Respective components listed in Tables 2 to 3 described later were blended in the ratio (mass ratio) listed in Tables 4 to 8, which were mixed by a tumbler for 20 min and, after that, supplied to TEX3 0HSST provided with one vent manufactured by Japan Steel Works. The mixture was kneaded under the condition of a screw rotation number of 200 rpm, a discharge rate of 15 kg/hour, and a barrel temperature of 290° C. The melted resin extruded in a strand shape was quenched in a water bath, and formed into pellets using a pelletizer to thereby give pellets of the polycarbonate resin composition.

Examples 1 to 15, Comparative Examples 1 to 12
Formation of Test Piece

The pellets obtained by the above-mentioned production method were dried at 120° C. for 5 hr and then injection-molded under the condition of a cylinder temperature of 290° C. and a mold temperature of 80° C. using an injection molding machine Model J50-EP manufactured by Japan Steel Works to thereby form a test piece for the UL test having a length of 125 mm, a width of 13 mm and a thickness of 0.8 mm, a flat plate-shaped test piece (90 mm×50 mm×2-state thickness of 1-3 mm), and a test piece for ASTM tensile impact test (thickness 3.2 mm) in accordance with ASTM D1822 Type S.

In the same manner, the pellets obtained by the above-mentioned method were dried at 120° C. for 5 hr and then injection-molded using a Sycap M-2 with a mold clamping force of 75 T manufactured by Sumitomo Heavy Industries, Ltd. under the condition of a cylinder temperature of 290° C. and a mold temperature of 80° C. to thereby mold an ISO multipurpose test piece (3 mm).

Moreover, in the same manner, the pellets obtained by the above-mentioned method were dried at 120° C. for 5 hr and then injection-molded into an Izod test piece (thickness 3.2 mm) previously provided with a notch of R=0.25, 0.5 or 1 under the condition of a cylinder temperature of 280° C., 300° C. or 320° C., and a mold temperature of 80° C., using EC160 with a mold clamping force of 160 T manufactured by TOSHIBA MACHINE CO., LTD.

Evaluation of Flame Resistance

The flame resistance of the individual polycarbonate resin compositions was evaluated after the humidity conditioning of the test piece for the UL test obtained by the above-mentioned method in a temperature-controlled room of a temperature of 23° C. and a humidity of 50% for 48 hr in accordance with the UL 94 test (burning test of plastic materials for device parts) determined by UNDERWRITERS LABORATORIES INC. (UL). The UL94V is a method for evaluating the flame resistance from an afterflame time and drip property of a test piece having a prescribed size and being held vertically after the contact with a flame of a burner for 10 sec. In order to have the flame resistance of V-0, V-1 or V-2, it is necessary to satisfy the standard shown in Table 1 below.

TABLE 1

|  | V-0 | V-1 | V-2 |
| --- | --- | --- | --- |
| Afterflame time of respective samples | 10 sec or less | 30 sec or less | 30 sec or less |
| Total afterflame time of 5 samples | 50 sec or less | 250 sec or less | 250 sec or less |
| Cotton ignition by drip | No | No | Yes |

Here, the afterflame time is a time length during which the test piece continues burning with a flame after the piece has been shut away from an ignition source. The ignition of cotton by drip is determined from whether or not a cotton for indication placed under the test piece with an interval of about 300 mm from the lower end thereof is ignited by a dripping material (drip) from the test piece. When even one sample among 5 samples does not satisfy the standard, the case was evaluated as NR (not rated) as it did not satisfy V-2. In Tables 4 to 6, the expression is "Flame resistance."

Evaluation of Impact Resistance

In the ISO multipurpose test piece (3 mm) obtained by above-mentioned method, in accordance with ISO 179, Charpy impact strength with a notch (unit: $kJ/m^2$) was measured under the condition of a V notch of R=0.25 formed, at 23° C. In Tables 4 to 6, the expression is "Charpy."

Evaluation of Molded Articles External Appearance

The external appearance of the plate-shaped test piece obtained by the method was observed with eyes, and evaluated as "○" when the surface was not rough but shiny, or as "x" when the surface was rough and not shiny. In Tables 4 to 6, the expression is "External appearance."

Evaluation of Impact Resistance in High Temperature Molding

Using Izod test pieces obtained by the method, which were previously provided with a notch of R=0.25, 0.5 or 1 in the injection molding, Izod impact strength with a notch (unit: J/m) was measured at 23° C. at respective cylinder temperatures of the molding machine, in accordance with ASTM D256. In Table 7, the expression is "Izod."

Evaluation of Long-Term Deterioration-Resistant Property

The test piece for ASTM tensile impact test obtained by the method was treated at 100° C. for a prescribed time, and tensile impact strength was measured for the test piece before the treatment (0 hr), or after 500 hr, 1000 hr or 1500 hr treatment using a digital impact test machine manufactured by Toyo Seiki Seisaku-Sho, Ltd. in accordance with ASTM D1822. In Table 7, the expression is "Tensile impact."

TABLE 2

| | Abbreviation | Sample |
|---|---|---|
| Polycarbonate resin | (A1) | Aromatic polycarbonate resin produced by an interfacial polymerization method from bisphenol A as a starting material, viscosity average molecular weight: 19000 |
| | (A2) | Aromatic polycarbonate resin produced by an interfacial polymerization method from bisphenol A as a starting material, viscosity average molecular weight: 21000 |
| Metal organic sulfonate | (B) | Potassium perfluorobutane sulfonate, trade name: BayowetC4 manufactured by LANXESS |
| Fluoropolymer | (C) | Fluoropolymer capable of forming fibril, trade name: FA-500B, manufactured by Daikin Industries, Ltd. |
| Polyalkylsilsesquioxane particle | (D1) | Polymethylsilsesquioxane particles having an average particle diameter of 0.8 µm, trade name: MSP-N080, manufactured by NIKKO RICA CORPORATION |
| | (D2) | Polymethylsilsesquioxane particles having an average particle diameter of 2 µm, trade name: Tospearl120, manufactured by Momentive Performance Materials Inc. |
| | (D3) | Polymethylsilsesquioxane particle having an average particle diameter of 2 µm, trade name: X-52-7056, manufactured by Shin-Etsu Chemical Co., Ltd. |
| | (D4) | Polymethylsilsesquioxane particles having an average particle diameter of 4.5 µm, trade name: Tospearl145, manufactured by Momentive Performance Materials Inc. |
| | (D5) | Polymethylsilsesquioxane particles having an average particle diameter of 0.5 µm, trade name: MSP-N050, manufactured by NIKKO RICA CORPORATION |
| | (D6) | Polymethylsilsesquioxane particles having an average particle diameter of 6 µm, trade name: Tospearl2000B, manufactured by Momentive Performance Materials Inc. |

TABLE 3

| | Abbreviation | Sample |
|---|---|---|
| Graft copolymer | (E1) | Core/shell type graft copolymer constituted of a core of butadiene-based rubber and a shell of methyl methacrylate, butadiene content: 80%, trade name: EXL2603, manufactured by Rohm and Haas |
| | (E2) | Graft copolymer of butadiene-based rubber and styrene/acrylonitrile, butadiene content: 58%, trade name: G-ABS CHT, manufactured by Cheil Industries Inc. |
| | (E3) | Graft copolymer of butadiene-based rubber and styrene/acrylonitrile, butadiene content: 40%, trade name: DP611, manufactured by Techno Polymer Co., Ltd. |
| | (E4) | Core/shell type graft copolymer constituted of a core of polyalkyl acrylate-based rubber and a shell of methyl methacrylate, butadiene content: substantially 0%, trade name: EXL2315, manufactured by Rohm and Haas |
| | (E5) | Core/shell type graft copolymer constituted of a core of polydimethylsiloxane-based rubber and a shell of styrene/acrylonitrile, butadiene content: substantially 0%, trade name: SRK200, manufactured by Mitsubishi Rayon Co., Ltd. |
| | (E6) | Core/shell type graft copolymer constituted of a core of butadiene-based rubber and styrene, and a shell of methyl methacrylate, butadiene content: 80%, trade name: E-901, manufactured by Mitsubishi Rayon Co., Ltd. |
| Other components | (F1) | Heat stabilizer tris(2,4-di-tert-butylphenyl) phosphite, trade name: Adekastab2112, manufactured by Asahi Denka Kogyo K. K. |
| | (F2) | Heat stabilizer octadecyl-3-(3,5-di-tert-butyl-4-hydroxyphenyl) propionate, trade name: IRGANOX1076, manufactured by Ciba |
| | (F3) | Mold-releasing agent stearyl stearate, trade name: UNISTER M9676, manufactured by NOF CORPORATION |
| | (F4) | Phosphoric ester-based flame retardant trade name: PX-200, manufactured by DAIHACHI CHEMICAL INDUSTRY CO., LTD. |
| Carbon black | (G1) | Carbon black/polystyrene master batch carbon black content: 40%, carbon black average particle diameter: 18 nm |
| | (G2) | Carbon black-polycarbonate oligomer master batch carbon black content: 33%, carbon black average particle diameter: 18 nm |

TABLE 4

| | Abbreviation | Unit | Examples | | | | | |
|---|---|---|---|---|---|---|---|---|
| | | | 1 | 2 | 3 | 4 | 5 | 6 |
| Resin composition | A | Part by mass | 96.2 | 96.2 | 96.2 | 96.2 | 94.2 | 96.2 |
| | B | | 0.1 | 0.1 | 0.1 | 0.1 | 0.1 | 0.1 |
| | C | | 0.4 | 0.4 | 0.4 | 0.4 | 0.4 | 0.4 |
| | D1 | | 1 | | | | | |
| | D2 | | | 1 | 1 | 1.5 | 2 | 3 |
| | D3 | | | | | | | |
| | D4 | | | | | | | |
| | D5 | | | | | | | |
| | D6 | | | | | | | |
| | E1 | | 2 | 1 | 2 | 2 | 2 | 2 |
| | E2 | | | | | | | |
| | E3 | | | | | | | |
| | E4 | | | | | | | |
| | E5 | | | | | | | |
| | E6 | | | | | | | |
| | F1 | | 0.05 | 0.05 | 0.05 | 0.05 | 0.05 | 0.05 |
| | F2 | | 0.1 | 0.1 | 0.1 | 0.1 | 0.1 | 0.1 |
| | F3 | | 0.15 | 0.15 | 0.15 | 0.15 | 0.15 | 0.15 |
| Flame resistance | | | V-1 | V-1 | V-1 | V-1 | V-1 | V-0 |
| Charpy | | kJ/m² | 56 | 50 | 57 | 55 | 54 | 51 |
| External appearance | | | ○ - x | ○ | ○ | ○ | ○ | ○ |

TABLE 5

| | Abbreviation | Unit | Example | | | | |
|---|---|---|---|---|---|---|---|
| | | | 7 | 8 | 9 | 10 | 11 |
| Resin composition | A | Part by mass | 96.2 | 96.2 | 96.7 | 94.2 | 96.2 |
| | B | | 0.1 | 0.1 | 0.1 | 0.1 | 0.1 |
| | C | | 0.4 | 0.4 | 0.4 | 0.4 | 0.4 |

TABLE 5-continued

| Abbreviation | Unit | Example 7 | 8 | 9 | 10 | 11 |
|---|---|---|---|---|---|---|
| D1 | | | | | | |
| D2 | | 3 | | | 1 | 1 |
| D3 | | | 1 | | | |
| D4 | | | | 1 | | |
| D5 | | | | | | |
| D6 | | | | | | |
| E1 | | 4 | 2 | 2 | | |
| E2 | | | | | 2 | |
| E3 | | | | | | |
| E4 | | | | | | |
| E5 | | | | | | |
| E6 | | | | | | 2 |
| F1 | | 0.05 | 0.05 | 0.05 | 0.05 | 0.05 |
| F2 | | 0.1 | 0.1 | 0.1 | 0.1 | 0.1 |
| F3 | | 0.15 | 0.15 | 0.15 | 0.15 | 0.15 |
| Flame resistance | | V-1 | V-1 | V-1 | V-1 | V-1 |
| Charpy | kJ/m² | 51 | 55 | 40 | 59 | 56 |
| External appearance | ○ - x | ○ | ○ | ○ | ○ | ○ |

TABLE 6

| | Abbreviation | Unit | Comparative Example 1 | 2 | 3 | 4 | 5 | 6 | 7 | 8 | 9 | 10 |
|---|---|---|---|---|---|---|---|---|---|---|---|---|
| Resin composition | A | Part by mass | 96.2 | 96.2 | 96.2 | 94.2 | 94.2 | 96.1 | 96.1 | 96.1 | 96.1 | 94.1 |
| | B | | 0.1 | 0.1 | 0.1 | 0.1 | 0.1 | 0.1 | 0.1 | 0.1 | 0.1 | 0.1 |
| | C | | 0.4 | 0.4 | 0.4 | 0.4 | 0.4 | 0.4 | 0.4 | 0.4 | 0.4 | 0.4 |
| | D1 | | | | | | | | | | | |
| | D2 | | 1 | 1 | 1 | 1 | 1 | | 0.3 | 8 | | |
| | D3 | | | | | | | | | | | |
| | D4 | | | | | | | | | | | |
| | D5 | | | | | | | | | | 1 | |
| | D6 | | | | | | | | | | | 1 |
| | E1 | | | 0.3 | | | | 2 | 2 | 2 | 2 | 2 |
| | E2 | | | | | | | | | | | |
| | E3 | | | | 2 | | | | | | | |
| | E4 | | | | | 2 | | | | | | |
| | E5 | | | | | | 2 | | | | | |
| | F1 | | 0.05 | 0.05 | 0.05 | 0.05 | 0.05 | 0.05 | 0.05 | 0.05 | 0.05 | 0.05 |
| | F2 | | 0.1 | 0.1 | 0.1 | 0.1 | 0.1 | 0.1 | 0.1 | 0.1 | 0.1 | 0.1 |
| | F3 | | 0.15 | 0.15 | 0.15 | 0.15 | 0.15 | 0.15 | 0.15 | 0.15 | 0.15 | 0.15 |
| Flame resistance | | | V-2 | V-2 | V-2 | NR | NR | NR | NR | V-2 | V-2 | V-2 |
| Charpy | | kJ/m² | 18 | 54 | 61 | 53 | 50 | 57 | 54 | 14 | 55 | 28 |
| External appearance | | ○ - x | ○ | ○ | ○ | ○ | ○ | ○ | ○ | x | ○ | x |

TABLE 7

| | Abbreviation | Unit | Ex. 12 | Ex. 13 | Ex. 14 | Ex. 15 | Comp. Ex. 11 | Comp. Ex 12 |
|---|---|---|---|---|---|---|---|---|
| Resin composition | A | Part by mass | 96.2 | 96.2 | 96.2 | 94.2 | 94.2 | 84.4 |
| | B | | 0.1 | 0.1 | 0.1 | 0.1 | 0.1 | |
| | C | | 0.4 | 0.4 | 0.4 | 0.4 | 0.4 | 0.3 |
| | D2 | | 1 | 1 | 1 | 1 | | |
| | E1 | | 2 | 3 | 4 | 5 | 2 | 5 |
| | F1 | | 0.05 | 0.05 | 0.05 | 0.05 | 0.05 | 0.05 |
| | F2 | | 0.1 | 0.1 | 0.1 | 0.1 | 0.1 | 0.1 |
| | F3 | | 0.15 | 0.15 | 0.15 | 0.15 | 0.15 | 0.15 |
| | F4 | | | | | | | 10 |
| Izod | | | | | | | | |
| 280° C., R = 1 | | J/m | 856 | 813 | 832 | 743 | 909 | 723 |
| 280° C., R = 0.5 | | | 823 | 744 | 662 | 675 | 822 | 734 |
| 280° C., R = 0.25 | | | 610 | 575 | 590 | 626 | 422 | 630 |
| 300° C., R = 1 | | | 887 | 875 | 757 | 596 | 867 | 864 |
| 300° C., R = 0.5 | | | 775 | 773 | 632 | 584 | 642 | 880 |
| 300° C., R = 0.25 | | | 617 | 637 | 574 | 576 | 307 | 613 |
| 320° C., R = 1 | | | 901 | 849 | 910 | 594 | 723 | 673 |
| 320° C., R = 0.5 | | | 566 | 677 | 610 | 505 | 296 | 642 |
| 320° C., R = 0.25 | | | 378 | 523 | 518 | 282 | 112 | 172 |
| Tensile impact | | | | | | | | |
| Before treatment (0 h) | | kJ/m² | 324 | — | 320 | 325 | 341 | 257 |
| 100° C., 500 h | | | 301 | — | 296 | 226 | 243 | 210 |
| 100° C., 1000 h | | | 311 | — | 280 | 247 | 192 | 141 |
| 100° C., 1500 h | | | 257 | — | 243 | 122 | — | — |

Examples 16 to 19, Comparative Example 13
Evaluation of Flame Resistance

Pellets obtained by the above-mentioned method were dried at 120° C. for 5 hr, which were then injection-molded using an injection molding machine Model SE100DU manufactured by Sumitomo Heavy Industries, Ltd. under the condition of a cylinder temperature of 290° C. and a mold temperature of 80° C. to thereby give a test piece for the UL test having a length of 125 mm, a width of 13 mm, and a thickness of 0.75 mm.

The test piece for the UL test having a thickness of 0.75 mm obtained was moisture-controlled in a temperature-controlled room of a temperature of 23° C. and a humidity of 50% for 48 hr, which was tested in accordance with the UL 94 test (burning test of plastic materials for device parts), in the same method as described above.

In Table 8, the results of the UL 94 test are expressed as "Flame resistance (0.75 mm)," and as "Σt" for the total afterflame time of five samples (total burning time).

Evaluation of Emboss External Appearance

Pellets obtained by the method were dried at 120° C. for 5 hr, which were then injection-molded using an injection molding machine Model SE100DU manufactured by Sumitomo Heavy Industries, Ltd. under the condition of a cylinder temperature of 290° C. and a mold temperature of 80° C. to thereby give an embossed flat plate having dimensions of 60 mm×60 mm×2 mm in thickness. The surface of the embossed flat plate was observed with eyes.

○: emboss external appearance is good

X: emboss external appearance is poor, with the generation of shine and white haze rior. Further, it is known that Comparative Example 1 containing no graft copolymer has an inferior impact resistance and has also an insufficient flame resistance. Moreover, it is known that Comparative Example 8 having a large addition amount of polyalkylsilsesquioxane particles and Comparative Example 10 containing polyalkylsilsesquioxane particles with a large average particle diameter are inferior in the impact resistance and in the external appearance.

Furthermore, as is known from Table 7, Examples represent a good impact resistance in a high temperature molding, and molded articles show a little notch dependency. Moreover, it is also known that the long-term deterioration-property is also good.

Consequently, it is known that the resin composition can favorably be used for bodies of electric/electronic devices, in particular, for such devices as battery packs, chargers, power source adapters and power source taps, in which heat tends to persist for a long time and for which the impact resistance at falling is also required.

As is known from Table 8, Examples 16 to 19 in which the carbon black was added in addition to polyalkylsilsesquioxane, were improved for the flame resistance thereof as compared with Example 2 in which the carbon black was not added. Furthermore, it is known that Examples 16 to 19 are good in the emboss external appearance as compared with Comparative Example 13 to thereby allow themselves to be used favorably for bodies of electric/electronic devices.

INDUSTRIAL APPLICABILITY

According to the polycarbonate resin composition and the molded article of the present invention, it is possible to

TABLE 8

| | Abbreviation | Unit | Ex. 16 | Ex. 17 | Ex. 18 | Ex. 19 | Ex. 2 (shown in the above) | Comp. Ex. 13 |
|---|---|---|---|---|---|---|---|---|
| Resin composition | A | Part by mass | 96.2 | 96.2 | 96.2 | 96.2 | 96.7 | 94.2 |
| | B | | 0.1 | 0.1 | 0.1 | 0.1 | 0.1 | 0.1 |
| | C | | 0.4 | 0.4 | 0.4 | 0.4 | 0.4 | 0.4 |
| | D1 | | | | | | | |
| | D2 | | 1 | 1 | 2 | 3 | 1 | |
| | D3 | | | | | | | |
| | D4 | | | | | | | |
| | D5 | | | | | | | |
| | D6 | | | | | | | |
| | E1 | | 2 | 2 | 2 | 2 | 2 | 2 |
| | E2 | | | | | | | |
| | E3 | | | | | | | |
| | E4 | | | | | | | |
| | E5 | | | | | | | |
| | G1 | | 0.5 | 2 | | | | 0.5 |
| | G2 | | | | 1 | 0.25 | | |
| | F1 | | 0.05 | 0.05 | 0.05 | 0.05 | 0.05 | 0.05 |
| | F2 | | 0.1 | 0.1 | 0.1 | 0.1 | 0.1 | 0.1 |
| | F3 | | 0.15 | 0.15 | 0.15 | 0.15 | 0.15 | 0.15 |
| Flame-resistance (0.75 mm) | | | V-0 | V-0 | V-0 | V-0 | V-1 | V-2 |
| Σt | | | 30 | 28 | 35 | 42 | 109 | — |
| Emboss external appearance | | ○ - X | ○ | ○ | ○ | ○ | — | X |

As is known from Tables 4 to 6, in Examples, the flame resistance is good, such as V-1 or more, and both of the impact resistance and the external appearance are good, but, in Comparative Examples, the individual flame resistance is V-2 or NR depending on the addition amount or kind of the graft copolymer, or the addition amount or kind of polyalkylsilsesquioxane, and thus the flame resistances thereof are infeenhance simultaneously the flame resistance, impact resistance and external appearance, and, therefore, they can be utilized in a wide range of fields such as parts of electric/electronic devices, OA devices, information terminal devices, household electrical appliances and lighting devices, in particular parts of electric/electronic devices. Thus, the invention has a very high industrial applicability.

What is claimed is:

1. A polycarbonate resin composition comprising 100 parts by mass of a polycarbonate resin (A), 0.001 to 2 parts by mass of a metal organic sulfonate (B), 0.001 to 1 parts by mass of a fluoropolymer (C), 0.5 to 4 parts by mass of polyalkylsilsesquioxane particles (D) having a volume-average particle diameter of 0.6 to 5 μm, 0.5 to 4.5 parts by mass of a graft copolymer (E) having a butadiene content ratio of 50% to 90%, and 0.0001 to 3 parts by mass of a carbon black (F), relative to 100 parts by mass of the polycarbonate resin;

wherein when the polycarbonate resin composition is injection-molded under a condition of a cylinder temperature of 290° C. and a mold temperature of 80° C. using an injection molding machine and formed to a test piece for ASTM tensile impact test having a thickness of 3.2 mm in accordance with ASTM D1822 Type S, and the test piece for ASTM tensile impact test was treated at 100° C. for 1000 hours, the tensile impact strength for the treated piece under the ASTM tensile impact test in accordance with ASTM D1822 is not less than 280 kJ/m$^2$.

2. The polycarbonate resin composition according to claim 1, wherein the metal organic sulfonate (B) is an alkali metal salt of a fluorine-containing aliphatic sulfonic acid.

3. The polycarbonate resin composition according to claim 1, wherein the metal organic sulfonate (B) is potassium perfluorobutane sulfonate.

4. The polycarbonate resin composition according to claim 1, wherein the polyalkylsilsesquioxane particle (D) is a polymethylsilsesquioxane particle.

5. The polycarbonate resin composition according to claim 1, wherein the graft copolymer (E) is a graft copolymer of a butadiene rubber and at least one selected from an aromatic vinyl compound, a vinyl cyanide compound and a (meth) acrylic acid ester.

6. The polycarbonate resin composition according to claim 1, wherein the graft copolymer (E) is a core/shell type graft copolymer comprising a core formed of a butadiene rubber and a shell formed from a (meth)acrylic acid ester compound.

7. The polycarbonate resin composition according to claim 1, wherein the content of the graft copolymer (E) is 1.5 to 4.5 parts by mass, relative to 100 parts by mass of the polycarbonate resin.

8. The polycarbonate resin composition according to claim 1, wherein the carbon black (F) is a black carbon master batch formed using a thermoplastic resin.

9. The polycarbonate resin composition according to claim 1, wherein the fluoropolymer (C) is a fluoroethylene resin capable of forming fibril.

10. The polycarbonate resin composition according to claim 1, wherein the content ratio (mass ratio) of the polyalkylsilsesquioxane particles (D) and the graft copolymer (E) is 1:0.5 to 1:6.

11. The polycarbonate resin composition according to claim 1, which has a flame resistance of V-1 or higher in accordance with the UL 94 test in a thickness of 0.8 mm.

12. The polycarbonate resin composition according to claim 11, wherein the butadiene content ratio is 70% to 90%.

13. The polycarbonate resin composition according to claim 1, wherein the polyalkylsilsesquioxane particles (D) have a volume-average particle diameter of 1 to 3 μm.

14. The polycarbonate resin composition according to claim 1, wherein the polycarbonate resin is an aromatic polycarbonate resin.

15. The polycarbonate resin composition according to claim 8, wherein the content ratio of the carbon black in the black carbon master batch is 20 to 50% by mass.

16. The polycarbonate resin composition according to claim 1, wherein 90% by mass or more of the polycarbonate resin composition is constituted of the polycarbonate resin (A), the metal organic sulfonate (B), the fluoropolymer (C), the polyalkylsilsesquioxane particles (D), the graft copolymer (E) and the carbon black (F).

17. A polycarbonate resin molded article formed from the polycarbonate resin composition according to claim 1.

18. A body of an electric device or electronic device comprising the polycarbonate resin molded article according to claim 17.

19. A body of a battery pack, a charger, or a power source adapter comprising the polycarbonate resin molded article according to claim 17.

* * * * *